United States Patent
Mincher

(10) Patent No.: US 10,092,869 B2
(45) Date of Patent: Oct. 9, 2018

(54) SEPARATOR

(71) Applicant: Parker-Hannifin Corporation, Cleveland, OH (US)

(72) Inventor: Adrian Richard Mincher, Leeds (GB)

(73) Assignee: Parker Hannifin Manufacturing (UK) Ltd., Hemel Hempstead (GB)

( * ) Notice: Subject to any disclaimer, the term of this patent is extended or adjusted under 35 U.S.C. 154(b) by 0 days.

(21) Appl. No.: 14/824,148

(22) Filed: Aug. 12, 2015

(65) Prior Publication Data
US 2015/0345351 A1    Dec. 3, 2015

Related U.S. Application Data

(63) Continuation of application No. PCT/GB2014/050734, filed on Mar. 12, 2014.

(30) Foreign Application Priority Data

Mar. 28, 2013  (GB) .................................... 1305713.8
Jan. 22, 2014  (GB) .................................... 1401040.9

(51) Int. Cl.
*B01D 45/08*    (2006.01)
*F01M 13/02*    (2006.01)
(Continued)

(52) U.S. Cl.
CPC ......... *B01D 45/08* (2013.01); *F01M 13/0011* (2013.01); *F01M 13/023* (2013.01);
(Continued)

(58) Field of Classification Search
CPC .... B01D 45/08; F01M 13/0011; F01M 13/04; F01M 13/023; F01M 2013/0427; F01M 2013/0433; F01M 2013/0016
See application file for complete search history.

(56) References Cited

U.S. PATENT DOCUMENTS 6,290,738 B1 *   9/2001   Holm ..................... B01D 45/08
                                                        55/309
8,048,212 B2 *   11/2011  Parikh .................... B01D 45/08
                                                        55/420
(Continued)

FOREIGN PATENT DOCUMENTS

DE    102009035742 A1    2/2011
WO      2011095790 A1    8/2011

OTHER PUBLICATIONS

Search Report for GB1305713.8 dated Sep. 24, 2013.
International Search Report and Written Opinion for International Application PCT/GB2014/050734 dated Jun. 13, 2014.

*Primary Examiner* — Dung H Bui
(74) *Attorney, Agent, or Firm* — Christopher Hunter

(57) ABSTRACT

A separator (1) for separating contaminants from a fluid stream having entrained particulate contaminants, comprises a cylindrical dividing wall (28) concentrically arranged within an impaction surface (35). The cylindrical dividing wall defines a first chamber (42) into which a fluid stream enters and flows axially through. The dividing wall has apertures (29) through which the fluid stream passes towards the impaction surface. As the fluid impacts the impaction surface, the contaminants are separated from the fluid and flow down to an oil outlet (23). A diaphragm (31) moves along an axis to adjust the open cross-sectional area of the apertures in the dividing wall according to a pressure differential between fluid pressure in the first chamber and a pressure reference by moving along the dividing wall to progressively occlude the apertures. The apertures are spaced so that there is no overlap between them along the actuator axis.

13 Claims, 16 Drawing Sheets

(51) Int. Cl.
  *F01M 13/04*   (2006.01)
  *F01M 13/00*   (2006.01)

(52) U.S. Cl.
  CPC ..... *F01M 13/04* (2013.01); *F01M 2013/0016* (2013.01); *F01M 2013/0427* (2013.01); *F01M 2013/0433* (2013.01)

(56) References Cited

U.S. PATENT DOCUMENTS

| | | | |
|---|---|---|---|
| 8,075,654 B2* | 12/2011 | Holzmann | B01D 45/06 55/399 |
| 2006/0249128 A1* | 11/2006 | Shieh | F01M 13/0011 123/572 |
| 2007/0256566 A1* | 11/2007 | Faber | B01D 45/08 96/417 |
| 2009/0100811 A1* | 4/2009 | Scheckel | B01D 45/08 55/448 |
| 2009/0120854 A1 | 5/2009 | Parikh | |
| 2009/0199826 A1* | 8/2009 | Meinig | B01D 45/08 123/573 |
| 2009/0288560 A1* | 11/2009 | Ruppel | F01M 13/04 96/408 |
| 2010/0101425 A1* | 4/2010 | Herman | B01D 45/08 96/400 |
| 2012/0192536 A1* | 8/2012 | Severance | B01D 45/08 55/418 |
| 2012/0318215 A1* | 12/2012 | Copley | B01D 45/08 123/41.86 |

* cited by examiner

SEPARATOR

CROSS REFERENCE TO RELATED APPLICATIONS

This application is a continuation of International Application No. PCT/GB2014/050734, filed Mar. 12, 2014, and which designated the United States; and which claims priority to Great Britain Application Nos. 1305713.8 filed Mar. 28, 2013 and 1401040.9 filed on Jan. 22, 2014, the disclosures of which are incorporated herein by reference.

BACKGROUND OF THE INVENTION

The present invention relates to a separator. In particular, the present invention relates to a separator for separating particulate, liquid and aerosol contaminants from a fluid stream.

Blow-by gas within a reciprocating engine is generated as a by-product of the combustion process. During combustion, some of the mixture of combustion gases escape past piston rings or other seals and enter the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 µm to 10 µm), soot particles, nitrous oxides (NOx), hydrocarbons and other organic species, carbon monoxide, carbon dioxide, oxygen, water, and other gaseous air components.

If blow-by gas is retained within a crankcase with no outlet, the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it is known to provide an outlet valve that allows the blow-by gas to be vented to the atmosphere. However, with increasing environmental awareness generally, and within the motor industry in particular, it is becoming unacceptable to allow blow-by gas to be vented to atmosphere due to the discharge of oil and other contaminants from within the crankcase. Furthermore, such venting increases the speed at which crankcase oil is consumed.

Consequently, it is known to filter the blow-by gas. The filtered blow-by gas may then either be vented to the atmosphere as before (in an open loop system), or it may be returned to an air inlet of the engine (in a closed loop system). The blow-by gas may pass through a filtering medium or another known form of gas contaminant separator. The conventional arrangement of an engine blow-by gas/oil separator returning cleaned gas to an engine air intake is commonly referred to as a Closed Crankcase Ventilation (CCV) system.

There is an increasing demand for higher efficiency cleaning of blow-by gas in both open and closed loop systems. Engine manufacturers and end users in general prefer only to use engine components that can remain in place for the life of the engine. While fit-for-life separators are known, typically only powered centrifugal separators and electrostatic precipitators have hitherto been able to achieve the required levels of separation efficiency. Such separators are costly to manufacture, consume electrical power, or have moving parts which may be prone to wear. Low cost, fit-for-life impactor separators (where separation occurs as a contaminated gas stream is incident upon an impactor plate transverse to the gas flow) are not usually able to achieve the required separation efficiency. Impactor separators are also referred to in the art as inertial gas-liquid impactor separators. It is known to use inertial gas-liquid impactor separators in closed crankcase ventilation systems. Contaminants are removed from the fluid stream by accelerating the fluid to a high velocity through a slit, nozzle or other aperture and directing the fluid stream against an impactor plate to cause a sharp directional change.

WO-A-2011/095790 discloses a separator for separating contaminants from a fluid stream using an inertial impactor surface. Contaminated blow-by gas flows from a regulator chamber through an aperture in a wall of the chamber so that it is directed against an impactor surface. The aperture tapers from a wide end at the top of the wall to a narrow end. The separator includes a diaphragm which slides along the wall so as progressively to cover and to uncover the aperture, varying the open area of the aperture according to the pressure in the regulator chamber. The tapered shape of the aperture can help to eliminate pump-surge conditions.

SUMMARY OF THE INVENTION

A separator is provided in which first and second apertures are provided in a dividing wall between a first chamber and an impaction surface, spaced so that there is no overlap between them along an axis along which an actuator moves to vary the open area of the apertures. The ratio of the spacing between the apertures along the actuator axis to the height of whichever of the first and second apertures has the smaller height, is zero or greater.

The separator provides for separating contaminants from a fluid stream which includes entrained particulate contaminants, the separator comprising:
  a first chamber having a first inlet through which a fluid stream enters the first chamber, to flow axially along the first chamber,
  an impaction surface located downstream of the first chamber, which is arranged to deflect the fluid stream after the fluid stream leaves the first chamber such that contaminants are separated from the fluid stream,
  a dividing wall which separates the first chamber from the impaction surface, the dividing wall having first and second apertures formed in it through which the fluid stream can pass out of the first chamber towards the impaction surface, and
  an actuator which is arranged to move along an actuator axis to adjust the open cross-sectional area of the apertures in the dividing wall according to a pressure differential between fluid pressure in the first chamber and a pressure reference by moving along the dividing wall so as progressively to occlude the apertures,
  in which the first and second apertures are spaced so that there is no overlap between them along the actuator axis, and the ratio of the spacing between the apertures along the actuator axis to the height of whichever of the first and second apertures has the smaller height is not more than about 2.5.

The provision of separate first and second apertures in the dividing wall can help to reduce the divergence in the flow of the blow-by gas through the apertures towards the impaction surface compared with a system in which the area for blow-by gas to flow out of the first chamber towards the impaction surface is provided by a single aperture. Accordingly, the direction in which the blow-by gas is flowing when it hits the impaction surface can be maintained closer to perpendicular to the surface (for example at an angle of 90±20° to the surface). This can help to optimise separation efficiency.

Optionally, the ratio of the spacing between the apertures along the actuator axis to the height of whichever of the first and second apertures has the smaller height is not more than about 2.0, preferably not more than about 1.5, preferably not more than about 1, more preferably not more than about 0.5, more preferably not more than about 0.25, more preferably not more than about 0.15, especially not more than about 0.1, for example not more than about 0.075. The value of the ratio is not less than zero so that there is no overlap between the apertures along the actuator axis. It can be preferred that the ratio of the spacing between the apertures to the height of the smaller aperture is at least about 0.05.

Optionally, the spacing between the apertures is at least about 0.05 mm, more preferably at least about 0.08 mm, for example at least about 0.1 mm.

Apertures may be offset transversely around the actuator axis. A smaller spacing between the apertures along the actuator axis can be achieved when the apertures are offset transversely around the axis of the device.

The angular value of the transverse offset, as measured between the centres of adjacent apertures in the axial direction, may be 180°. Preferably, the angular offset may be less than 180°, more preferably 120° or less, more preferably between 100° or less, more preferably 75° or less, and more preferably 35° or less.

The spacing between the apertures along the actuator axis may be close to or equal to zero. This can help to maintain a continuous variation of the aperture size with variation in the differential pressure between the first chamber and the pressure reference. This is useful to provide for efficient operation of the separator with little or no pressure surging.

The use of an impaction surface to separate contaminants from the fluid stream has the advantage that the separator does not involve use of separation media which is consumed with use and has to be replaced.

The fully-open edge of one or more of the apertures (which is the edge which the actuator crosses when the state of the aperture changes between partially open and fully open) or the fully-closed edge of one or more of the apertures (which is the edge which the actuator crosses when the state of the aperture changes between partially closed and fully closed) or each of the fully-open and fully-closed edges of one or more of the apertures can be arranged so that it extends perpendicular to the actuator axis and is straight along substantially all of its length. An aperture having straight edge which is perpendicular to the actuator axis will tend to close completely or to open completely simultaneously across its full width as the actuator moves across the aperture. It is possible to position two apertures close together along the actuator axis without overlap between them if the edges of the apertures are straight and perpendicular to the actuator axis.

It can be preferred that the fully-closed edge of the aperture that is last to close as the actuator moves along the dividing wall has a non-straight edge. The non-straight edge can be shaped so that the aperture has a concave edge. A non-straight edge, especially a concave edge, can help to reduce the risk of pump surge and hunting. A non-straight edge, especially a concave edge, can help to reduce the risk of pump surge, and high and low pressure hunting.

When each of the fully-open and fully-closed edges of an aperture is straight, and the end edges are also straight and extend parallel to the actuator axis, the aperture will be rectangular (or square). It can be preferred that each of the first and second apertures is approximately rectangular (although the fully-closed edge of one of them, for example the first aperture, may be non-straight as discussed above).

The dimensions of the apertures may be such that the area of the smaller of the first and second apertures is at least about 2 mm$^2$, more preferably at least about 4 mm$^2$, for example at least about 5 mm$^2$. The dimensions of the apertures may be such that the area of the larger of the first and second apertures is not more than about 50 mm$^2$, preferably not more than about 40 mm$^2$, for example not more than about 30 mm$^2$. The areas of the first and second apertures can be approximately equal. The separator might include one or more openings in the dividing wall which can be opened by continued movement of the actuator, once the actuator has moved to a position in which the first and second and possibly other apertures are open to flow of fluid. The said openings might have an area that is significantly greater than the areas of the first, second and possibly other apertures, for example having an area which is at least five times the area of the largest aperture. The said openings can provide a significant increase in the open area through which the fluid stream passes through the dividing wall within the separator, enabling the separator to avoid being overloaded in extreme operating conditions.

The ratio of the width of each of the first and second apertures measured transverse to the actuator axis to its height may be at least about 1, preferably 1.5, more preferably at least about 2.0, for example at least about 2.5. For some applications, for example in which the first chamber has a circular cross-section with a diameter of more than about 40 mm, the value of the ratio can be at least about 5.0 or even at least about 7.0.

The centre of the second aperture may be displaced along the dividing wall transversely relative to the centre of the first aperture. For example, the first and second apertures may be spaced so that there is no transverse overlap between them. This can make it easier to arrange the apertures so that there is no overlap between them along the actuator axis, especially when the dividing wall is made from a material which is fragile (for example from a polymeric material).

The dividing wall can be in the form of a sheet. The sheet might extend in just two dimensions. An actuator which is intended to cooperate with a dividing wall in the form of a sheet can be in the form of a separate sheet where the actuator and the dividing wall contact one another on their facing surfaces. The actuator can slide relative to the dividing wall along an axis which is parallel to the dividing wall.

The dividing wall may be cylindrical and the first chamber may be defined by the cylindrical dividing wall. The cylinder which is defined by the dividing wall may have a circular cross-section.

The actuator can be arranged to slide over the dividing wall so as to adjust the open cross-sectional area of the apertures (and any larger openings) in the wall. It will generally be preferred that the line along which the actuator contacts the wall is at a constant height on the wall measured along the actuator axis. Accordingly, when the dividing wall is cylindrical with a circular cross-section, the contact line will define a circular plane which is perpendicular to the actuator axis. When the dividing wall is in the form of a sheet, the contact line will extend along the wall, perpendicular to the actuator axis.

The actuator may comprise a diaphragm which separates the first chamber from a pressure reference, the diaphragm being arranged to move in response to a change in the differential pressure across the diaphragm. The contact line between the actuator and the dividing wall can be provided by the diaphragm itself. Alternatively, the actuator can include a sealing component which is attached directly or indirectly to a diaphragm, where the position of the sealing component is controlled by the diaphragm.

The actuator may be configured to occlude all of the apertures in its fully closed position.

The diaphragm may comprise a tubular membrane which is fastened towards one end of the dividing wall and is arranged progressively to fold and to unfold so as respectively to uncover and to cover the apertures. The position of the tubular membrane is determined by the pressure differential between fluid in the first chamber and a pressure reference. The pressure differential across the diaphragm can provide the sealing pressure between the diaphragm actuator and the dividing wall.

The first and second apertures may be located close to one another on one side of the cylinder, for example with a small spacing between the apertures so that there is no overlap between them around the actuator axis. The provision of a small spacing between the apertures can help to avoid weakness in the dividing wall resulting from the provision of the apertures. Locating the apertures close to one another around the actuator axis, for example with little or no overlap, allows the dividing wall to be formed in a moulding step, in which adjacent apertures are formed in the wall by sliding a mould component transversely.

The separator may include at least a third aperture which is spaced apart from the first and second apertures around the periphery of the cylinder. The spacing along the actuator axis between the first aperture and the third aperture can be greater than the spacing between the first aperture and the second aperture. The separator may further include a fourth aperture which is located close to the third aperture, spaced apart around the periphery of the cylinder form the first and second apertures. The spacing along the actuator axis between the first aperture and the fourth aperture can be greater than the spacing between the first aperture and the third aperture. The spacing along the actuator axis between the second and third apertures can be similar (within 20%) to the spacing between the first and second apertures. The spacing along the actuator axis between the third and fourth apertures can be similar (within 20%) to the spacing between the first and second apertures.

The first and second apertures can be spaced apart around the cylinder. This can allow the two apertures to be formed in a moulding step in which the two apertures are formed in the dividing wall using respective movable mould components. The separator can include at least a third aperture where the spacing along the actuator axis between the first aperture and the third aperture is greater than the spacing between the first aperture and the second aperture. The spacing along the actuator axis between the second and third apertures can be similar (within 20%) to the spacing between the first and second apertures. The first and the third components can be formed close to one another on one side of a cylindrical dividing wall. For example, they could overlap in the direction which is perpendicular to the actuator axis, without necessarily weakening the dividing wall to an unacceptable degree, and could be aligned with one another in a stack. The first and third apertures arranged in this way can be formed in a moulding step in which the two apertures are formed in the dividing wall using a common movable mould component. A fourth aperture can be provided. The fourth aperture can be located relative to the second aperture similarly to the location of the third aperture relative to the second aperture.

When the first chamber has a circular cross-section, its internal diameter can be is at least about 10 mm, or at least about 20 mm. Its internal diameter can be no more than about 120 mm, and preferably 80 mm, for example not more than about 65 mm. Separator devices whose sizes are outside these ranges are also envisaged.

It can be preferred that the apertures are arranged in the dividing wall so that the direction in which fluid flows through the apertures is perpendicular to the dividing wall at the aperture. This can help to ensure that fluid flowing between the dividing wall and an impaction surface which is spaced apart from the dividing wall flows towards the impaction surface perpendicular to the surface. When the dividing wall is non-planar, for example with a circular cross-section, it can be preferred in order to meet this objective for the edge walls of the apertures which are circumferentially spaced apart around the dividing wall to be substantially perpendicular to the surface of the dividing wall. Preferably the angle between the circumferentially spaced apart edge walls of the first aperture or of the second aperture of each of them and a tangent to the surface of the dividing wall at the edge wall is not more than about 20°, more preferably not more than about 15°. A small deviation from zero in the angle between the circumferentially spaced apart edge walls of the aperture and a tangent to the surface of the dividing wall can facilitate formation of the aperture in a moulding operation, allowing removal of a mould component by translation.

The edges of an aperture in a non-planar dividing wall which are spaced apart along the actuator axis may be perpendicular to the surface of the wall.

The apertures may be formed in the dividing wall to follow a helical pathway around the periphery of the dividing wall.

The aperture which is the last aperture to close can have a fully-closed edge which does not extend in a straight line, perpendicular to the direction in which the actuator moves. For example, the fully-closed edge can be curved. This can help to reduce pump surge due to a sudden closure of the aperture at the furthest extent of travel of the actuator.

The separator can include a biasing component which acts on the actuator. The biasing component can act between the actuator and a point which is fixed relative to the dividing wall (for example an end of the biasing component can be fixed to a point on the wall of the first chamber). The biasing component can be used to vary the band of operating pressures within a vessel (such as a crankcase) from which the fluid stream is supplied to the separator. For example, the spring can bias the actuator towards the closed position so as to increase the normal minimum pressure or the normal maximum pressure or both within the vessel. A reduction in the biasing force exerted on the actuator towards the closed position (including the application of a biasing force towards the open position) can reduce normal minimum pressure or the normal maximum pressure or both within the vessel. The biasing component can change the operating pressure within the vessel by at least about 2 mBar, for example at least about 5 mBar.

BRIEF DESCRIPTION OF THE DRAWINGS

The invention will now be described, by way of example only, with reference to the accompanying drawings of which.

DETAILED DESCRIPTION OF THE PREFERRED EMBODIMENT

The conventional arrangement of an engine blow-by gas/oil separator returning cleaned gas to an engine air intake is commonly referred to as a Closed Crankcase Ventilation (CCV) system.

Figure 1:
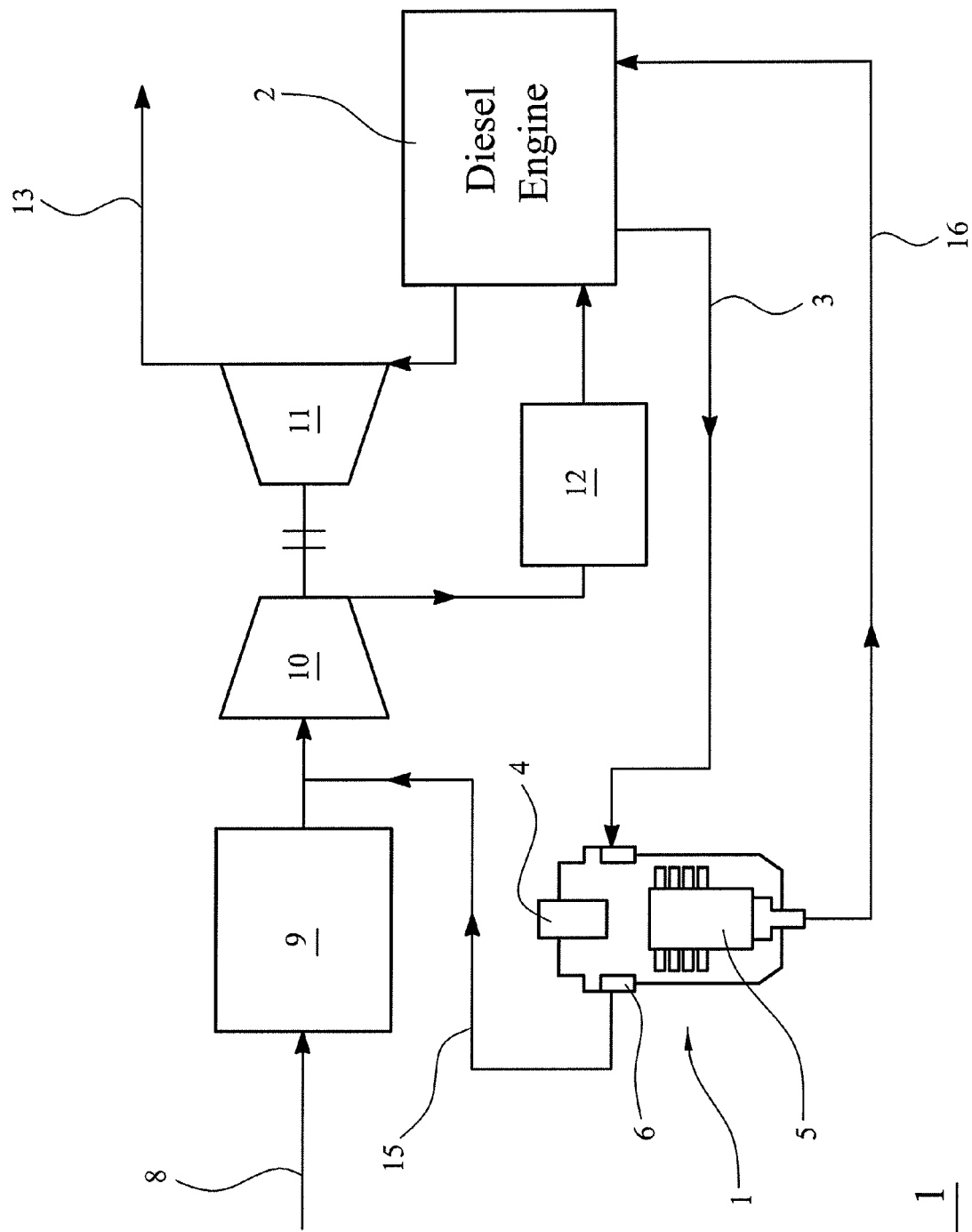
FIG. 1 schematically illustrates an engine system including a closed crank ventilation (CCV) system.

FIG. 1 illustrates schematically the arrangement of a conventional CCV system 1 coupled to a diesel engine 2. Blow-by gas from the engine crankcase passes to the CCV system 1 along inlet duct 3. The CCV system 1 comprises a regulator 4 coupled to the inlet duct 3 and a contaminant separator 5 in series. The regulator 4 and separator 5 are shown combined in FIG. 1.

A pump 6 is provided within the CCV system 1 to increase the pressure drop across the separator 5, thereby increasing the filtering efficiency. Cleaned blow-by gas exits the CCV system 1 through gas outlet 7 and is returned to the engine air intake system. Specifically, the engine air intake system draws in air from outside of the vehicle through an inlet 8, the air then passing through an inlet air filter and silencer 9, a compressor 10 driven by a turbo charger 11 (in turn driven by the engine exhaust 13) and an after cooler 12 to cool the compressed air before it is supplied to the engine 2. The cleaned blow-by gas passes from the gas outlet 15 to the compressor 10. Oil and other contaminants separated from the blow-by gas are returned to the engine crankcase through an oil drain 16.

Figure 2:
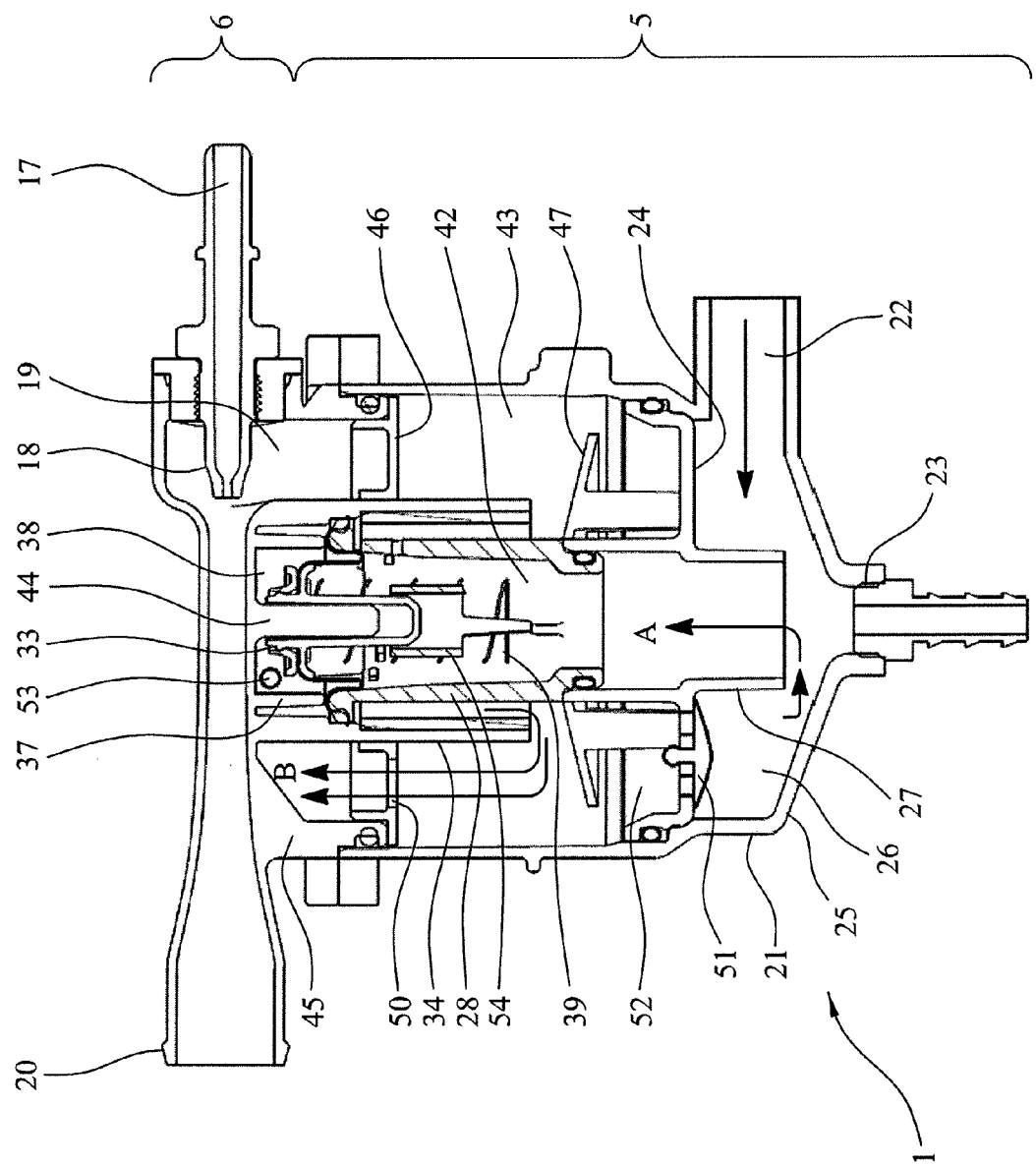
FIG. 2 illustrates in a cross sectional view a CCV system including an impactor separator in accordance with the invention.
Figure 3:
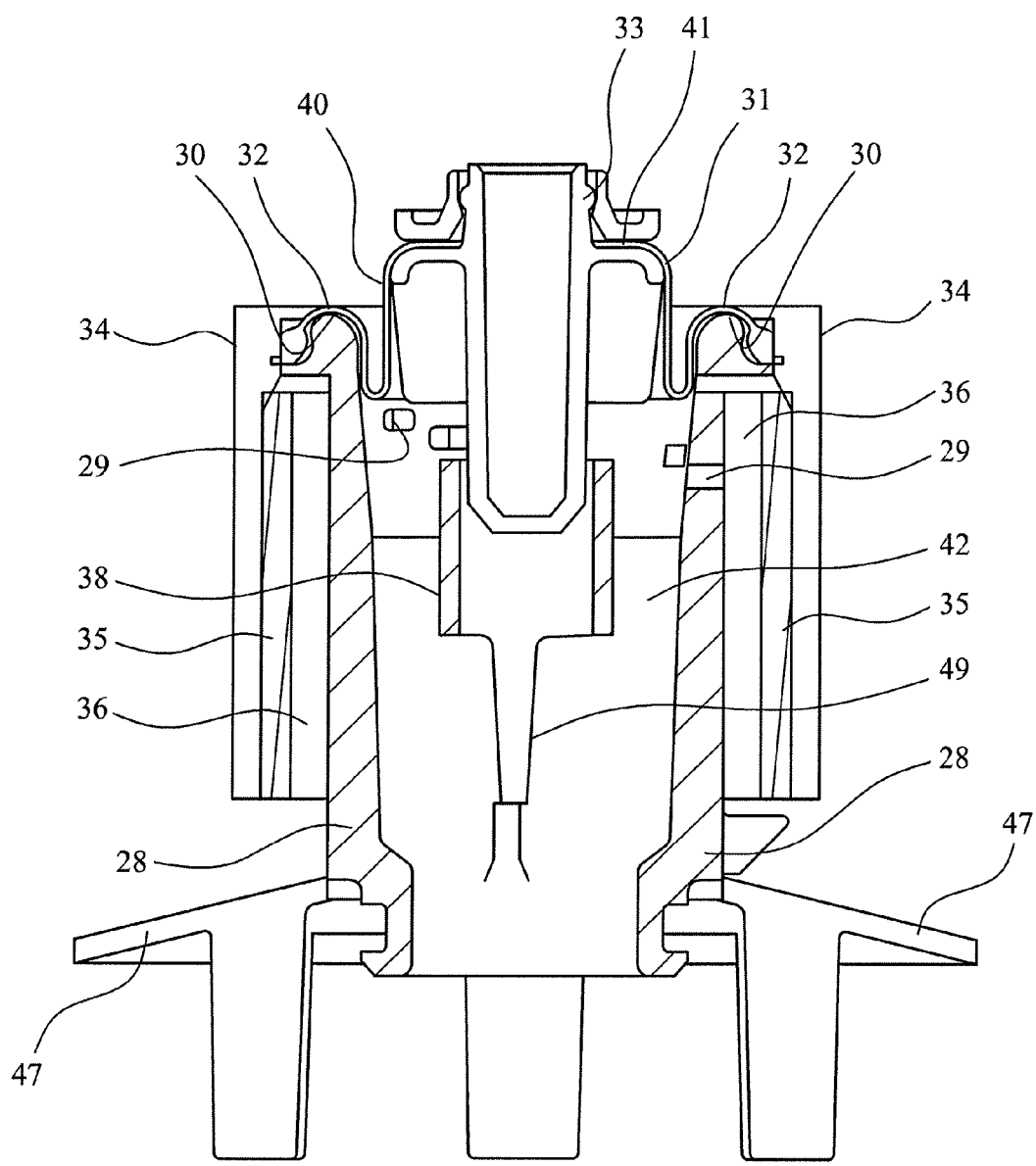
FIG. 3 is an enlarged cross sectional view of part of the impactor separator of FIG. 2.

Referring now to FIG. 2, this illustrates a cross sectional view of parts of a CCV system 1 including a separator 5 for separating liquid, aerosol and particulate contaminants from a blow-by gas stream. The respective portions comprising a separator 5 and a pump 6 are shown. In the present invention, the function of the regulator can be performed by means of a rolling diaphragm 31 as will be described in further detail below.

The separator 5 and pump 6 are combined in a single unit. The separator 5 has a housing 21 which includes an inlet 22, and an oil drain outlet 23 which returns separated oil to the engine crankcase via the oil drain 16.

The separator 5 includes a cylindrical dividing wall 28 extending lengthways within the separator housing 21, the interior of which forms a first chamber 42.

The housing 21 has a mounting plate 24 provided towards the base section 25 of the housing 21 and above the oil drain outlet 23. The underside of the mounting plate 24 and base section 25 define a lower chamber 26 of the separator 5. The mounting plate 24 has a separator inlet tube 27 which opens into the lower chamber 26 at one open end. The dividing wall 28 is mounted on the other open end of the separator inlet tube 27. The separator inlet tube 27 connects the first chamber 42 to the lower chamber 26 to define a continuous passage for the blow-by gases to flow through from inlet 22 to the first chamber 42 via the lower chamber 26, and separator inlet tube 27. Blow-by gases from the crankcase are directed from the crankcase into the housing 21 via the inlet 22 and through into the separator inlet tube 27 as indicated by the arrow A in FIG. 2.

An arrangement of spaced apertures 29 are provided in the dividing wall 28, towards the upper end of the dividing wall 28 remote from the separator inlet tube 27. This arrangement will be discussed in further detail below.

The upper end of the dividing wall 28 is closed off by means of a flexible diaphragm arrangement.

The flexible diaphragm arrangement comprises a rolling diaphragm 31 which is attached to the upper edge 30 of the dividing wall 28 by means of a sealing arrangement 32 which can be beading or an O-ring seal.

The pump 6 is mounted on the top of the housing 21 to form the single unit with the separator 5. As mentioned above, the pump 6 serves to generate a region of low gas pressure in order increase the velocity of the gases through the apertures 29 and to draw contaminated blow-by gases through separator 5.

A first inlet 17 to the pump 6 receives a source of pressurised gas, referred to herein as boost gas. The boost gas is provided by the turbo charger 11 or any other source of pressurised gas such as exhaust gas. When used on a turbocharged engine the boost gas may be a derived from a source of pressurised gas such as the intake manifold. Alternatively, the pressurised gas could be derived directly from the turbocharger. The first inlet 17 has a nozzle 18, formed as a convergent nozzle, such as a de Laval nozzle, which serves to accelerate the boost gas to a high velocity, for instance between 100 to 500 m·s$^{-1}$, with the boost gas typically exceeding Mach 1 at least in the region of the convergent nozzle 18.

The first inlet 17 is connected to an upper chamber 19 of the housing 21, which, in turn, is connected to a diffuser tube 20. The diffuser tube 20 is generally formed as a cylinder. The side walls of the diffuser tube 20 are not necessarily straight for the whole of their length, and may taper outwardly towards the end of the tube remote from nozzle. This tapering assists in controlling the direction of flow and mixing of the combined gas flow.

The upper end of the housing 21 has the diffuser tube 20 mounted thereon. The diffuser tube 20 includes a mounting flange 45 for mounting the diffuser tube 20 on the housing 12.

A cylindrical tube 34 extends from the underside of the diffuser tube 20. The upper end of the dividing wall 28, including the rolling diaphragm arrangement is located within the circular tube 34. The internal wall of the cylindrical tube 34 and the outer wall of the dividing wall 28 define an annular space 36. The internal wall of the cylindrical tube 34 provides an impaction surface 35 the function of which will be described in further detail below. The dividing wall 28 separates the first chamber 42 from the impaction surface 35, which in this embodiment is circular.

The space between cylindrical tube 34 and the housing 21 defines a second chamber 43 which is connected to the upper chamber 19 in the pump 6. An annular diffuser plate 46 is provided at the upper part of the housing 21 around the cylindrical tube 34 and separates the upper chamber 19 from the second chamber 43.

The annular diffuser plate 46 has a curved aperture 50 formed therein which connects the second chamber 43 to the upper chamber 19. The curved aperture 50 extends partially around the annulus of the diffuser plate 46. Clean blow-by gas, stripped of contaminants and oil, flows from the annular space 36 through the second chamber 43 and is directed up to the chamber 19 and the pump 6 through the curved aperture 50. Thus, gas flowing from the annular space 36 does not take the direct path into the upper chamber 19, but rather takes a path which is between 90° to 180° from the upper chamber 19. This is shown by the path B in FIG. 2.

An inner circular flange 37 is provided concentrically within the cylindrical tube 34. The rolling diaphragm 31, along with inner circular flange 37, defines an upper reference chamber 38. The reference chamber 38 is at atmospheric pressure by an air inlet 51 which connects to the outside of the CCV system 1.

The rolling diaphragm 31 is supported at a central portion 41 by an actuator 33 which is configured to move up and down in a longitudinal direction within the first chamber 42 to cause the diaphragm 31 to sequentially cover and uncover the apertures 29 provided in the upper portion of the dividing wall 28 as it moves up and down.

The actuator 33 is a closed ended tube which is slidably mounted on a finger-like extension 44 extending from the diffuser tube 20. This arrangement serves to keep the actuator 33 moving in the longitudinal direction.

The diaphragm 31 comprises an annular rolling portion 40, alternatively referred to as a rolling convolute, which is the portion that progressively covers and uncovers the apertures 29 as the central portion 41 moves up and down A cylindrical support 54 is located concentrically with the dividing wall 28. A biasing component in the form of a regulator spring 39 is located around the cylindrical support. The cylindrical support 54 is attached by means of three circumferentially equidistantly spaced protrusions 49 extending outwardly of the cylindrical support 54 and connected to the internal surface of the dividing wall 28. The regulator spring 39 acts on the actuator 33 to regulate the movement of the actuator 33 as it moves in response to changing pressure differential. The regulator spring 39 is supported by the three protrusions 49 and positioned underneath the actuator 33. The regulator spring 39 allows the range of normal operating pressure within the crankcase to be shifted within a range of values, for example in the range plus or minus 10 mBar.

A baffle 47 is supported on the mounting plate 24. The baffle 47 is located circumferentially around the periphery of the upper portion of the separator inlet tube 27. The baffle 47 serves to direct oil separated from the blow-by gas to the oil outlet 23 via a check valve 51. Oil separated from the gas therefore flows down the baffle 47 into a sump 52 formed in the mounting plate 24, and back to the oil outlet 23 through the check valve 51, which opens when the pressure in the lower chamber 26 is the same or slightly above that in the sump 52. A number of check valves 51 can be provided although only one is shown in FIG. 2.

Figure 4:
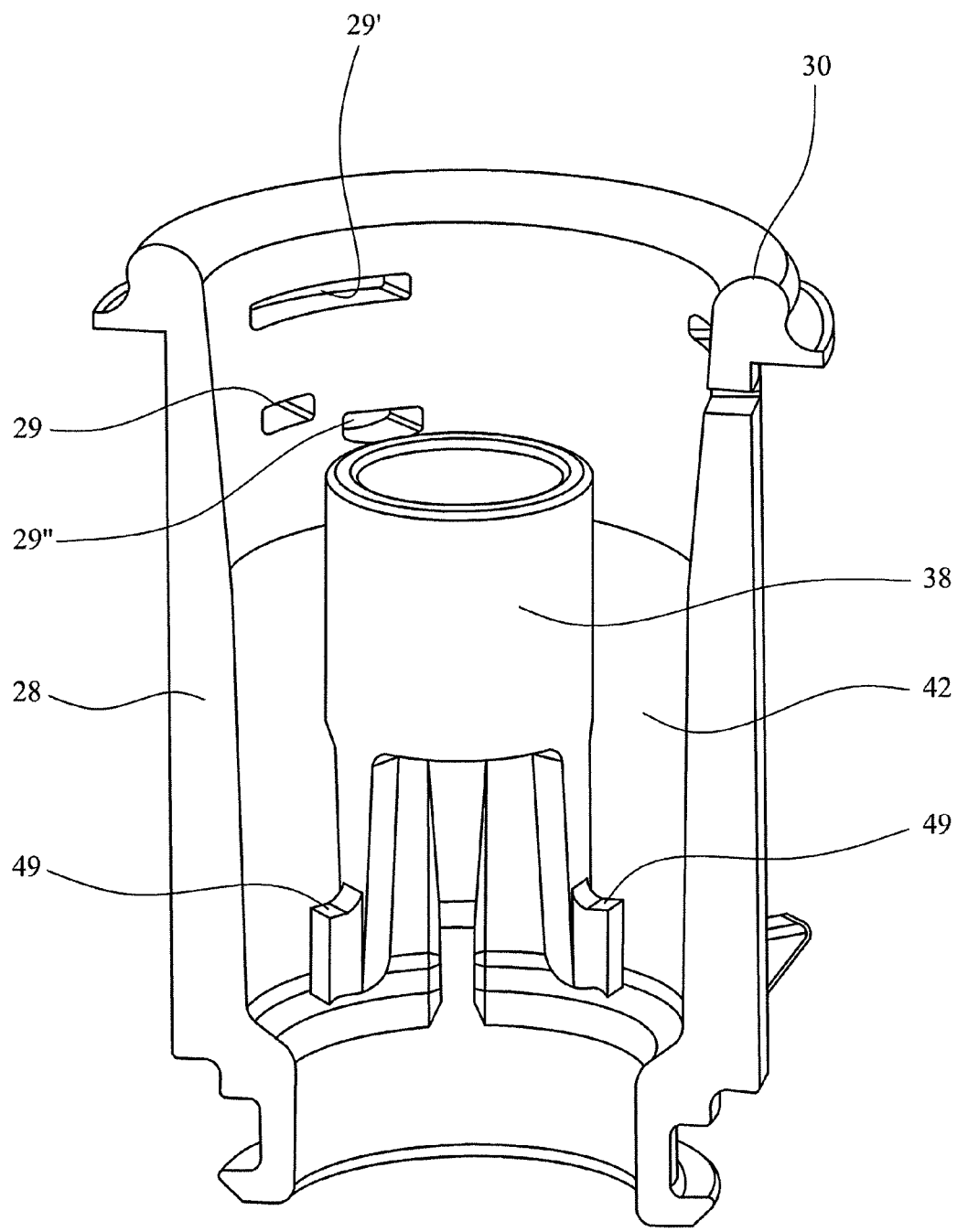
FIG. 4 is a cut-away perspective view of part of the impactor separator of FIG. 3 for operating at blow-by gas flow rates of between 0 and 250 liters per minute.
Figure 5:
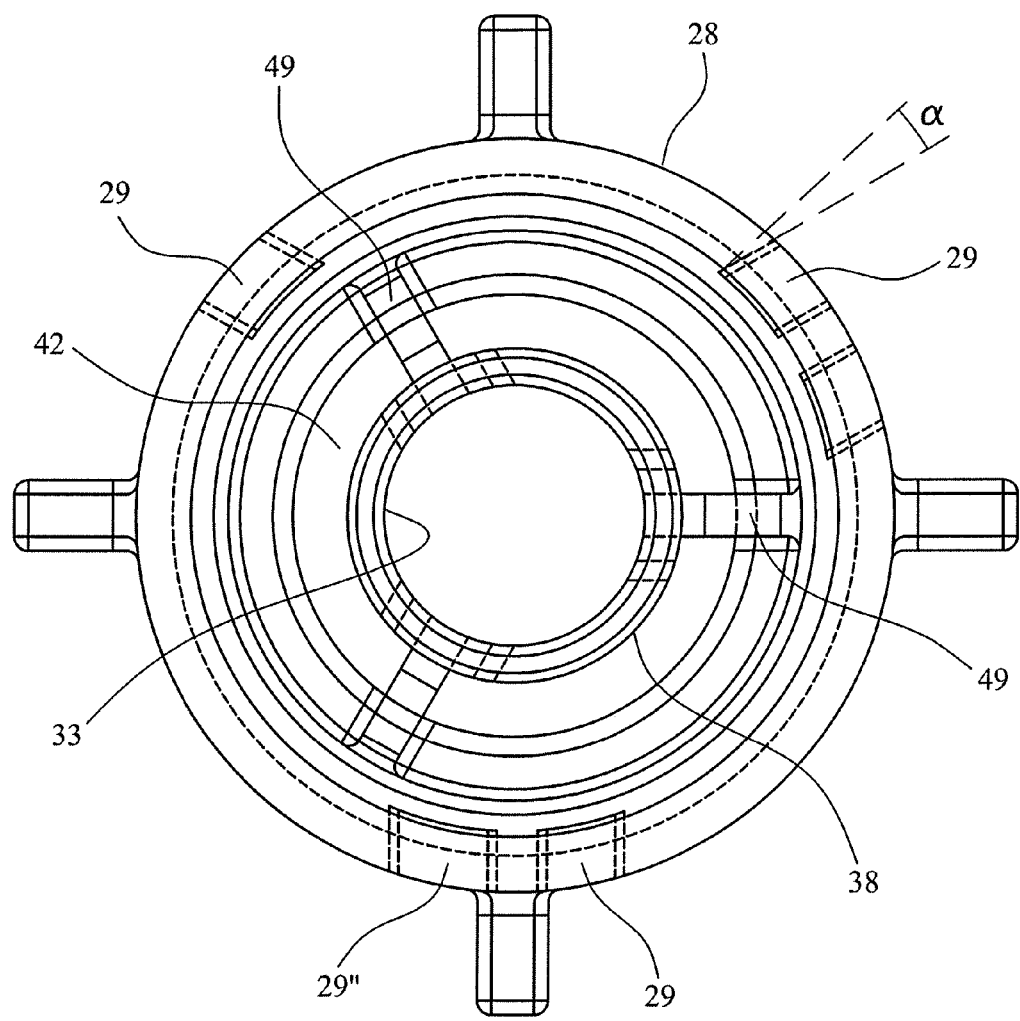
FIG. 5 is a plan view of the impactor separator detail of FIG. 4.
Figure 6:
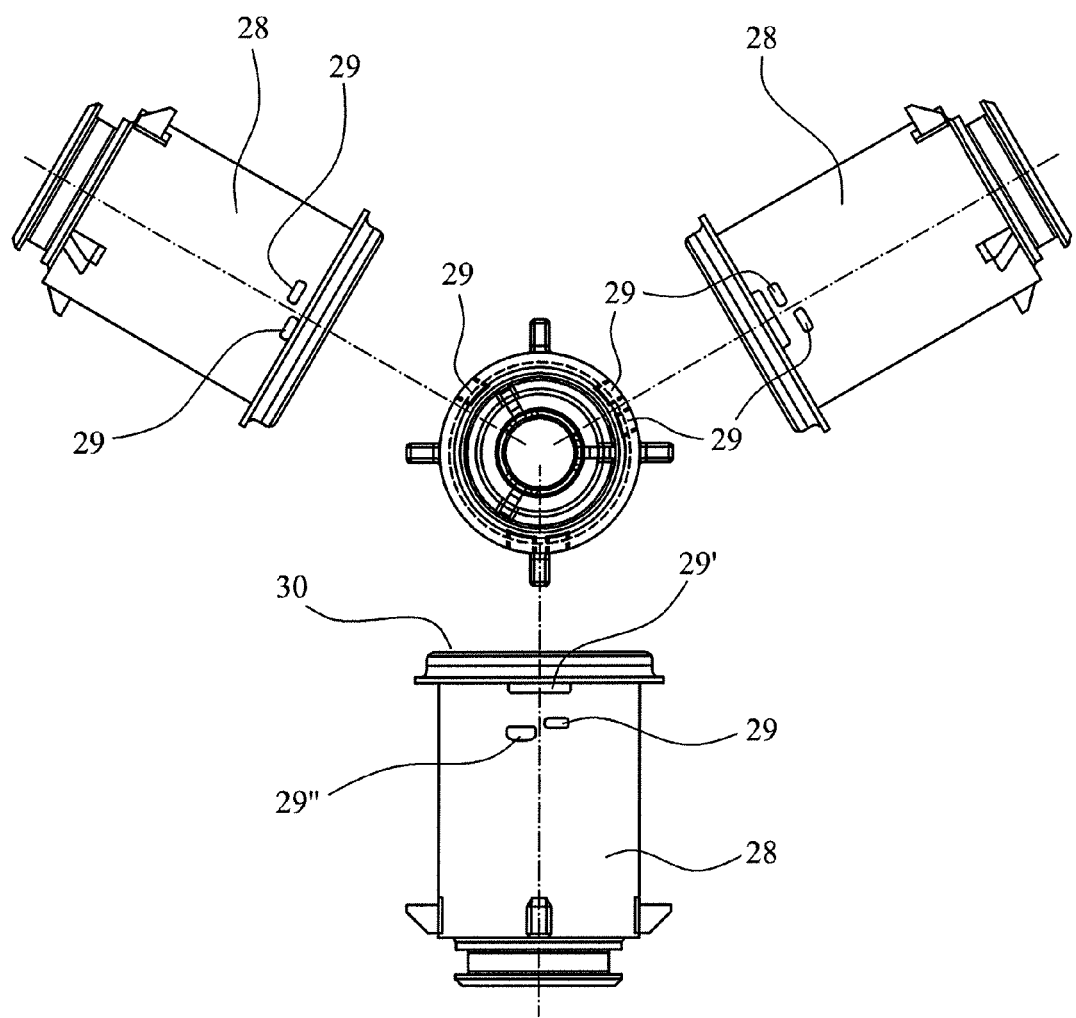
FIG. 6 is the plan view of the detail of the impactor separator of FIG. 5 with three side projections showing side views.

In the first embodiment of the invention, the arrangement of apertures 29 around the dividing wall 28 is as illustrated in FIGS. 4 to 6.

There are three groups of apertures spaced substantially equidistantly around the circumference of the dividing wall 28. All of the apertures 29 are rectangular in shape and elongate in the circumferential direction with a width, x, and a height, y. They are spaced from each other in both the longitudinal and transverse directions as will be discussed further below.

The values of x and y are selected to provide the required pressure drop for a given flow rate of blow-by gas through the aperture 29.

In this embodiment, each group comprises a pair of apertures 29 spaced apart transversely with a separation of b, such that the centre of the one of the pair of apertures 29 is displaced apart transversely along the dividing wall 28. The first and second apertures 29 of each group are located close to one another on one side of the periphery of the dividing wall 28. The next group of apertures 29 is then spaced apart from the first group of apertures around the periphery of the dividing wall 28.

In the direction of the longitudinal axis, z, of the impactor 5, dividing wall 28, and actuator 33, the separation a, between successive apertures 29 in a group of apertures is called the spill gap. Unnecessary spill causes a reduction in velocity of the blow-by gas through the aperture 29. In order to prevent unnecessary spill, this longitudinal separation, a, should be small, preferably zero with no overlap between the apertures 29 along the actuator axis, z. i.e. the spill gap, a, should be 0 mm or greater. With a small separation, peak velocity is maintained for a given pressure differential across the impactor 5 and keeps the vector paths for the airflow taking the shortest distance to the impaction surface 35.

Each group of apertures 29 are located at different longitudinal distances, d, from the upper edge of the dividing wall 28, where d is the distance from the upper edge of the dividing wall 28 to the lower edge of the lowest aperture 29 of the group. As such, the apertures follow a helical path around the periphery of the dividing wall 28.

In addition, two larger apertures 29' are provided adjacent the upper edge of the dividing wall 28 and co-located with one of the second or third group of apertures: one of the larger apertures 29' with each group of apertures 29. These apertures 29' are provided for conditions of engine brake or excessive increase in flow rate.

In use, contaminated blow-by gas is actively drawn out of the crankcase and through the separator 5. The pressure drop across the separator 5 generated by the pump 6 overcomes the high pressure differential of the separator 5 without causing an excessively high crankcase pressure. That is, because of the reduction in pressure caused by the pump 6, the blow-by gas may be drawn through a smaller impaction gap causing more efficient separation.

Gas is drawn into the separator inlet tube 27 generally along the path indicated by arrow A in FIG. 2 through the lower chamber 26. This section acts as a cyclonic pre-separator and the separator inlet tube 27 at this point defines the centre of a vortex of the gas. Liquid oil and large particles are separated from the gas at this stage and flow to the oil drain outlet 23. The blow-by gas then passes upwards through the separator inlet tube 27, into the first chamber 42 which is closed at its upper end by diaphragm 31. The blow-by gas passes through one or more of the apertures 29 and is incident upon the annular impaction surface 35. Oil and other contaminants separated from the blow-by gas at the impaction surface 35 flow under gravity to oil drain outlet 23 via the sloping baffle 47, sump 52 and check valve 51. Oil from the oil drain outlet 23 is returned to the crankcase.

High speed boost gas jet from the first inlet 17 passes into chamber 19. The high velocity boost gas jet causes a region of reduced pressure within the chamber 19 in the vicinity of the nozzle 18. Pressure is reduced by up to 250 mBar relative to external atmospheric pressure. This reduction in pressure allows cleaned blow-by gas from the separator 5 to be drawn into chamber 19 generally along the path of arrow B in FIG. 2.

The blow-by gas flow is entrained and accelerated by the boost gas, intermixing with the boost gas and accelerating to approach the speed of the boost gas. A terminal velocity will be reached at the outlet of the diffuser 20 based on total flow rate.

The combined gas stream passes into a diffuser tube 20. In order to achieve satisfactory entrainment and acceleration of the blow-by gas, preferably the diameter of the diffuser tube should be between 2 to 5 times greater, preferably 3 to 4 times greater, than the critical diameter (typically, the smallest diameter) of boost gas nozzle 18. The position of the critical diameter (alternatively referred to as the throat of the nozzle) may vary from the narrowest point of the nozzle due to aerodynamic effects, as is known in the art of nozzle design.

The separator 5 may be considered to be a variable impactor separator as it is intended to respond to differences between the blow-by gas inlet pressure and the outlet pressure to increase the separation efficiency, as will now be described.

As mentioned above, the reference chamber 38 is kept at atmospheric pressure by an air inlet which connects to the outside of the CCV system 1. The first chamber 42 and lower chamber 26 is therefore at substantially the same pressure as the engine crankcase.

The blow-by gas passes into the annular space 36 through one or more apertures of the apertures 29. The number of apertures 29 open will vary as the rolling diaphragm 31 rolls up and down under control of the actuator 33 to cover and uncover the apertures 29.

The size and number of slots 29 determines the minimum differential pressure drop across the separator 5.

There are two embodiments of the invention described herein, both have three groups of two apertures 29, but the sizes and relative dimensions are different.

The relative dimensions of the apertures 29 in the groups of apertures can be described in terms of a ratio, R being the ratio of the spill gap a to the height, y, of whichever of the two apertures in the pair has the smaller height.
So, $R = a/y$ For a spill gap a of 0 mm, the value of R will be zero. R will always have a value of zero or greater. R should have a value which is not more than 2. It can be preferred that the value of R is less than this, as discussed above.

Values of R for the pairs of apertures 29 in the two embodiments are provided in Tables 1 and 2 below.

A second ratio S, being the ratio of the width, x, to the height, y, for each aperture can also be used as a measure of the relative dimensions of the apertures.
Thus, $S = x/y$.

Preferably the value of S is at least 1.

The area of each aperture should be greater than 0.2 mm$^2$ to prevent excessive aerodynamic drag. Areas of 6 mm$^2$ to 12 mm$^2$, could be typical values, with an upper limit of 30 mm$^2$.

Figure 10:
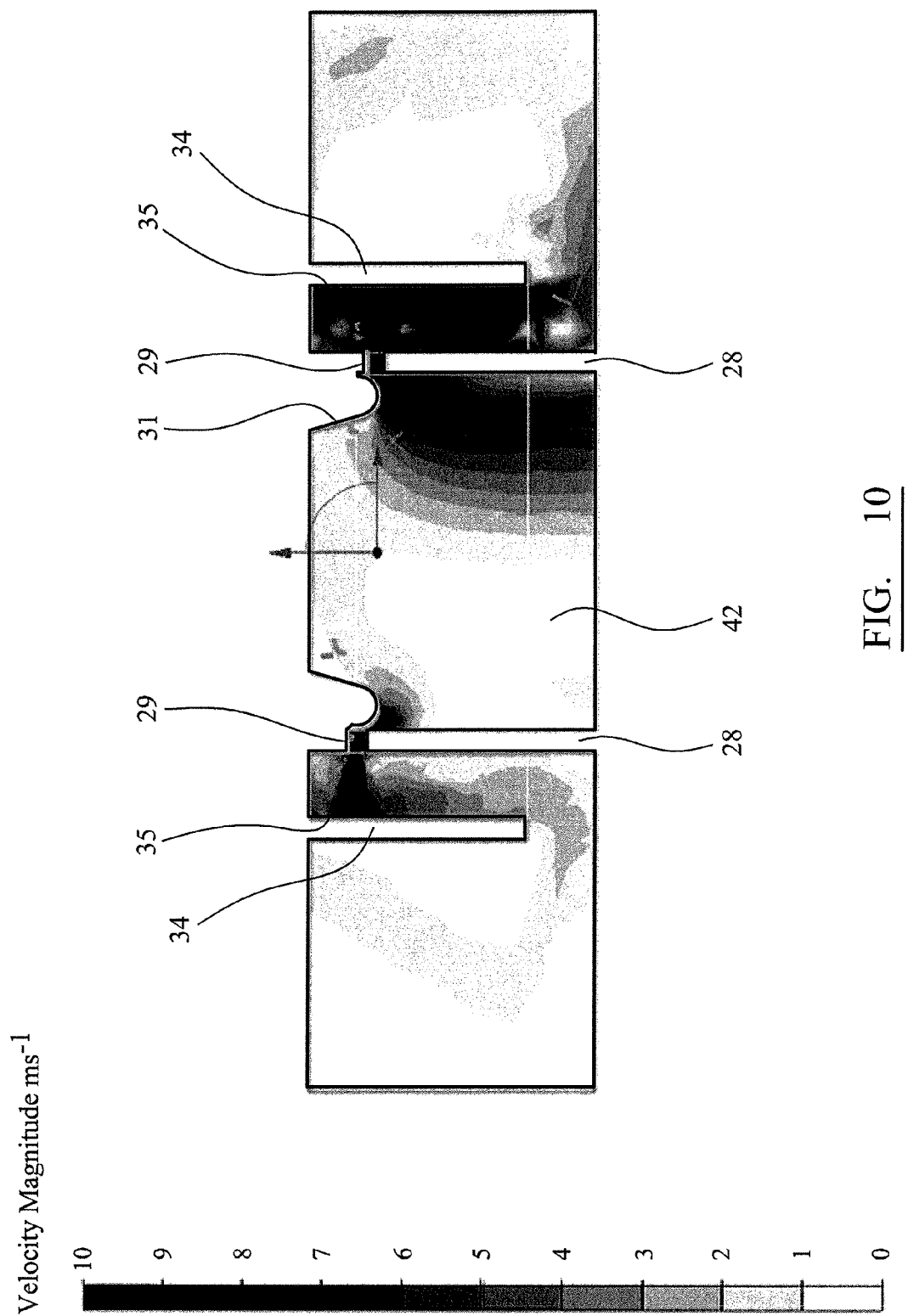
FIG. 10 is an illustration of the flow of blow-by gas within the dividing wall of the impactor of the present invention in the x-z directions, the x-z directions being represented by the perpendicular arrows.
Figure 11:
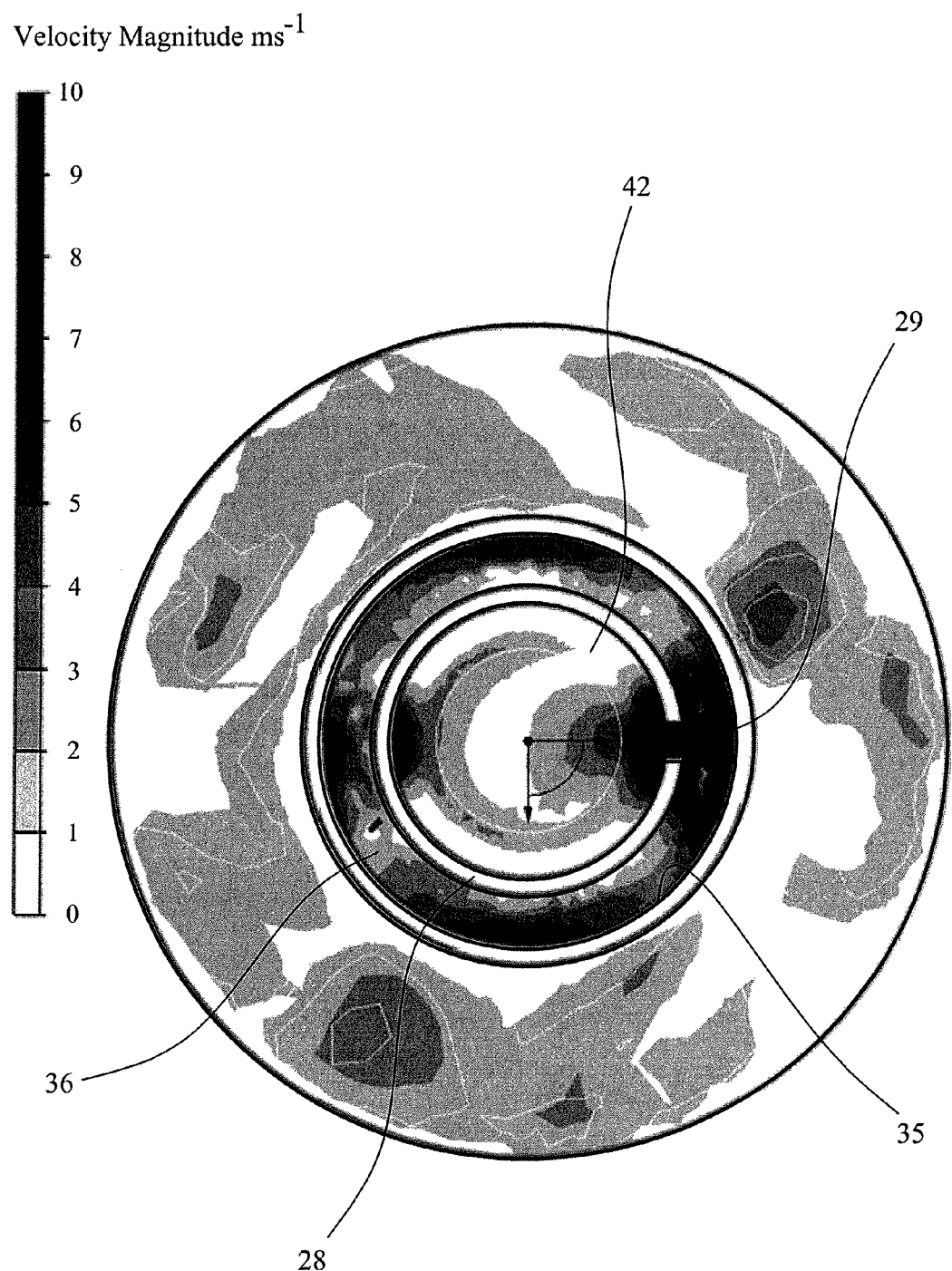
FIG. 11 is an exemplary illustration of the a filled drawing illustrating the flow of blow-by gas within the dividing wall of the impactor of the present invention in the x-y directions, the x-y directions being represented by the perpendicular arrows.
Figure 12:
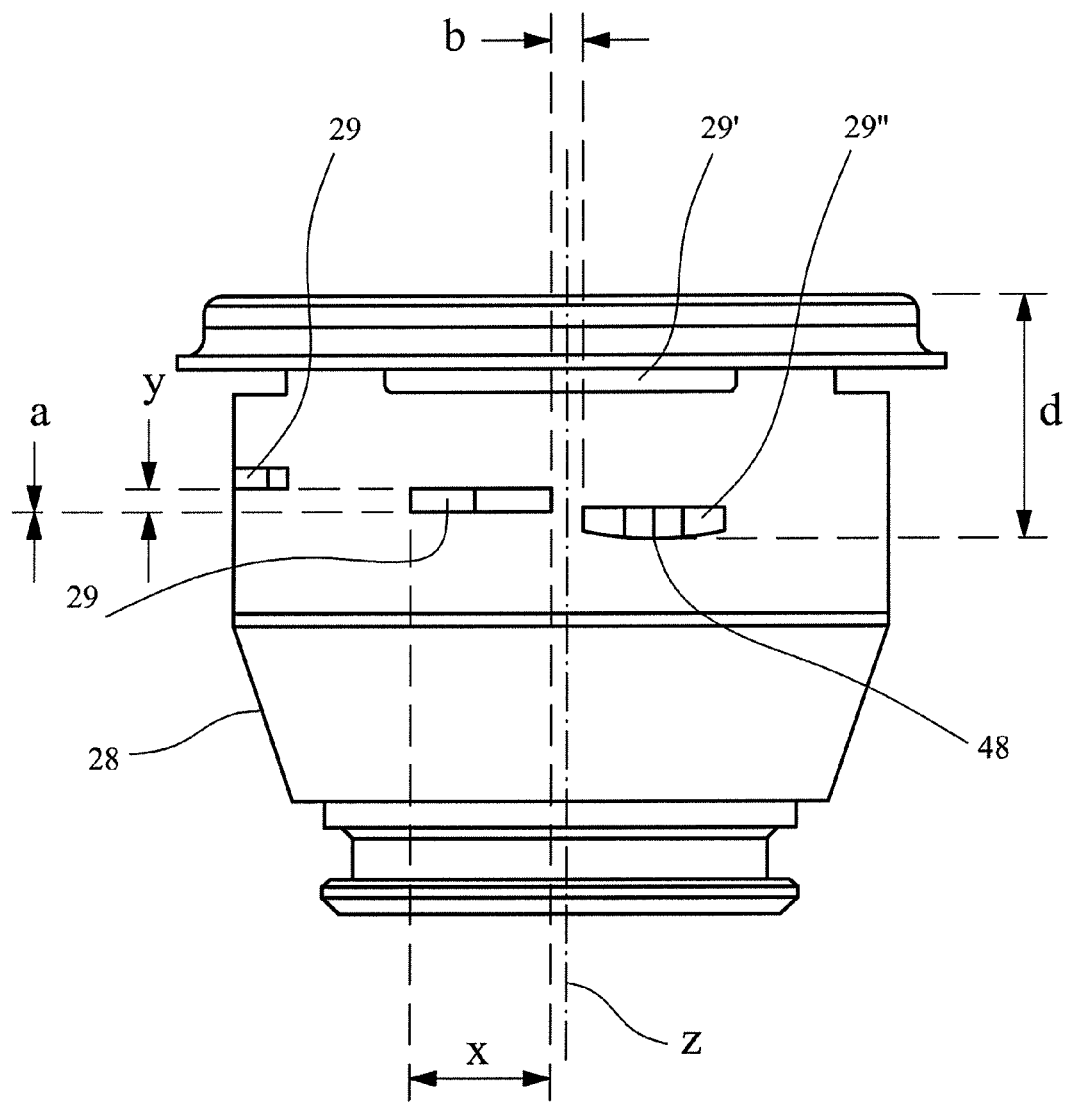
FIG. 12 is a diagram of the dividing wall for the separator of the present invention illustrating aperture dimensions and spacing.

As the contaminated blow-by gas travels through the apertures 29, separation of oil particles due to radial acceleration of the particles occurs. The flow of the blow-by gas is through the apertures 29 and impaction and separation of oil particles due to radial acceleration in making a 180° turn occurs both on the diaphragm 31 face and as the blow-by gas hits the impaction surface 35. This is illustrated in FIGS. 10 and 11.

The impaction surface 35 may be covered with a material opposite the apertures 29 to reduce the tendency of oil droplets and other contaminants to bounce off the impaction surface 35. The media covering the impaction surface serves to reduce re-entrainment of the contaminants.

The pump 6 is used to overcome the pressure drop across the separator 5. Under various engine loads, speed or engine breaking conditions both the vacuum generated by the pump 6, and the volume of blow-by gas passing through the separator 5 changes. To maintain an acceptable crankcase pressure according to the variable vacuum conditions generated by the pump 6, the diaphragm 31 moves up and down to cover and uncover the apertures 29.

The pump 6 is powered with air from the engine turbo and thus creates pressure lift. The developed pressure lift is used to enhance the performance of the impactor 5. By subjecting the second chamber 43 to vacuum, the pressure in the first chamber 42 will consequentially be reduced. The rolling diaphragm 31 responds to cover or close the apertures 29, and whilst the rolling diaphragm 31 is reference to atmosphere, the pressure in the first chamber 42 will be stabilised relative to atmosphere. Similarly, if the vacuum is reduced in the second chamber 43, the pressure in the first chamber 42 will increase and the diaphragm 31 will respond to open up the apertures 29. This relationship then maintains near atmospheric pressure in the first chamber 42 and creates a pressure drop across the impactor 5. This pressure drop is directly related to the separation efficiency of the impactor 5. When the velocity of the gas is accelerated above 100 m/s the fractional efficiency of the impactor 5 is improved.

Thus, a low flow rate through the first chamber 42 or a high vacuum in the second chamber 43 tends to close the diaphragm 31 over the apertures 29 thus decreasing the aperture open area/increasing the pressure differential across the separator 5, and thus preventing excess negative pressures in the engine crankcase.

Conversely, a high flow rate through the first chamber 42 or a low vacuum in the second chamber 43 tends to cause the diaphragm to open up more of the apertures 29 thus increasing the aperture open area/decreasing the pressure differential across the separator 5, and preventing excess positive pressures in the engine crankcase.

The pressure differential of the separator 5 is adjusted and crankcase pressure can be regulated precisely according to atmospheric pressure on the opposing side of the rolling diaphragm 31 or with the specification of the regulator spring 39 which is acts on the actuator 33.

The lowest aperture 29'' of the dividing wall 28 has a lower edge 48 which is curved or so as to be non-linear. This ensures that there is not a sharp cut off when the flexible diaphragm 31 covers and uncovers the lowest aperture 29''. When this occurs a 'square form' pressure change occurs. The pump 6 then reacts and pulls a high vacuum and the pressure on the upstream has to significantly increase to overcome the negative pressure in the downstream. This non-linear cross sectional area is provided to a near closed position of the rolling diaphragm 31 to prevent pump surge.

By providing of an array of apertures 29 which do not overlap axially, the directional control and velocity streamlines of the blow-by gas can be focused towards the impaction surface 35 via the shortest path. The fractional efficiency is raised when the streamline takes the shortest distance from the aperture exit to the impaction surface 35. This in combination with the gas reaching peak velocity for the given pressure differential can reduce the amount of oil and other contaminants that are carried out with the gas as it exits.

The interaction between the apertures 29 and the rolling diaphragm 31 can maintain relative atmospheric pressure control to the upstream of the impaction surface 35. FIGS. 10 and 11 illustrate how the blow-by gas flows through the apertures 29 and towards the impaction surface 35. In FIGS. 10 and 11, the darker the shading, the greater the velocity of the blow-by gas as exemplified by the legend in FIGS. 10 and 11. Actual velocities will depend upon the size and dimensions of the apertures and impactor.

Figure 8:
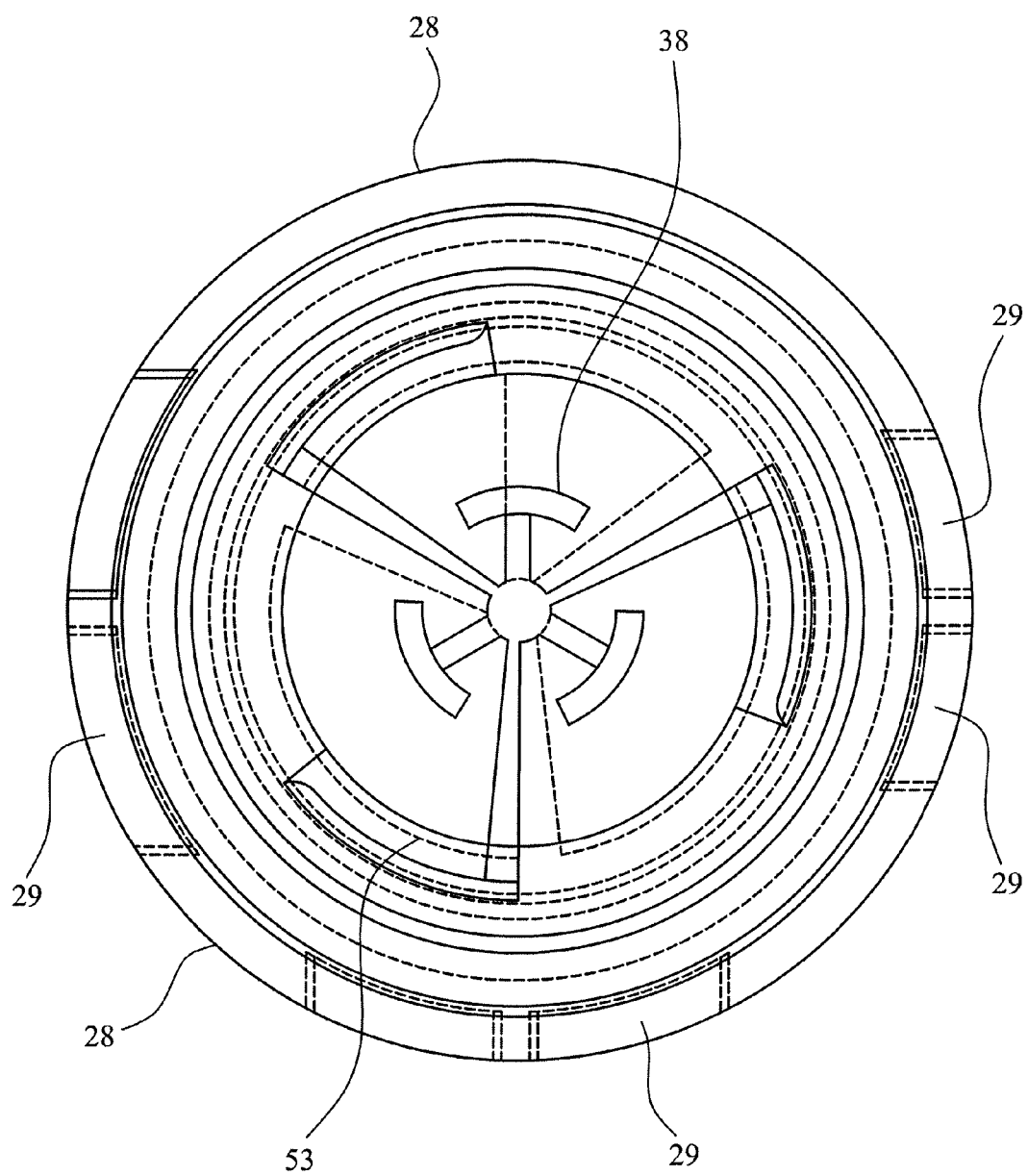
FIG. 8 is a plan view of the impactor separator detail of FIG. 7.

FIGS. 5 and 8 show the circumferentially spaced apart edges of the apertures 29 being formed at an angle α to the radius of the dividing wall 28. The angle is preferably not more than 15°. The edges of the apertures 29 which are spaced apart along the actuator axis z are perpendicular to the surface of the dividing wall 28.

Figure 7:
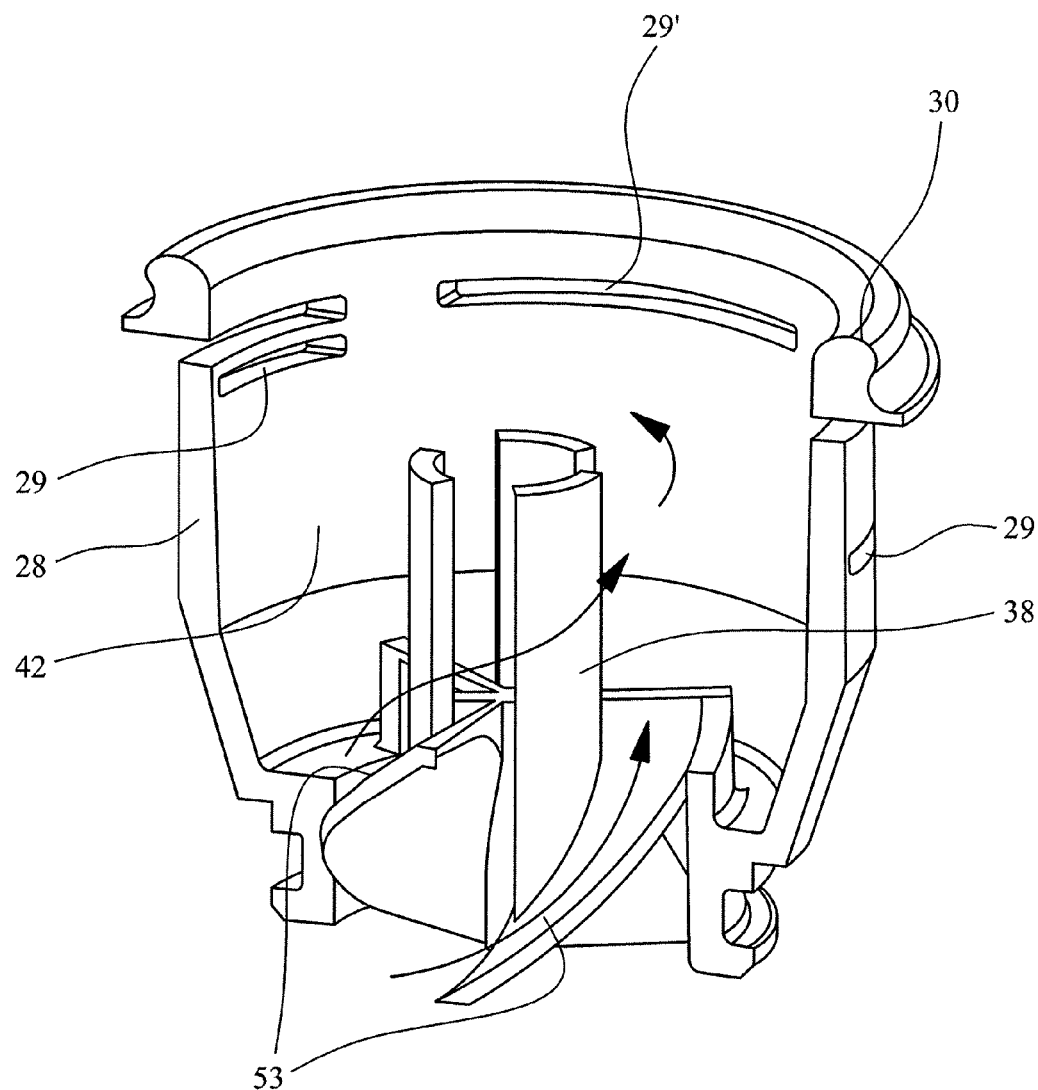
FIG. 7 is a cut-away perspective view of part of an alternative embodiment of the impactor separator of the invention for operating at blow-by gas flow rates between 0 and 500 liters per minute.
Figure 9:
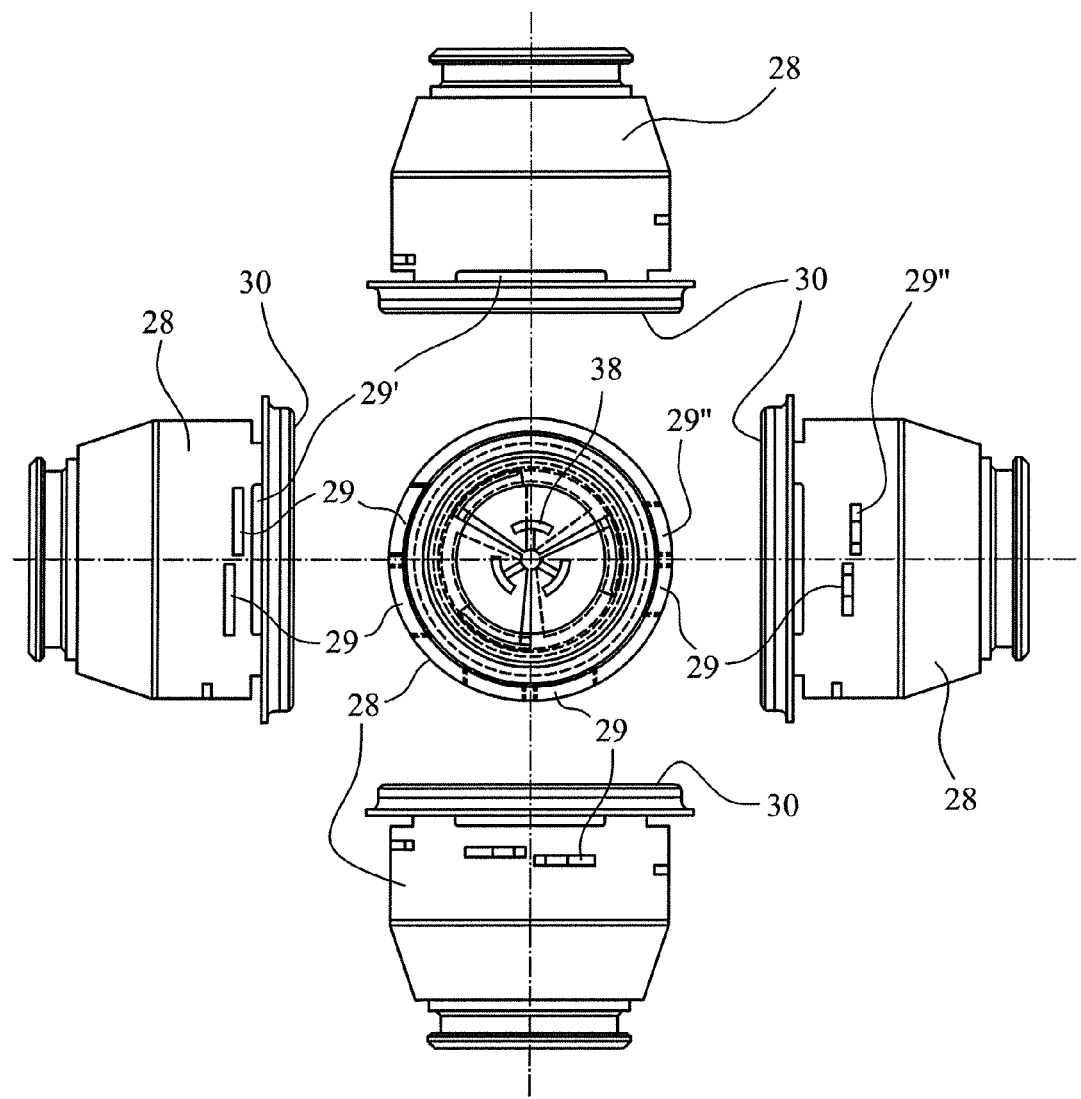
FIG. 9 is the plan view of the detail of FIG. 8 with four side projections showing side views.

In a second embodiment of the invention, illustrated in FIGS. 7, 8 and 9, the numbers and dimensions of the apertures 29 are different. Specifically, the second embodiment could be used for gas flow rates of up to 500 liters per minute. It has a larger diameter so that the velocity of the gas after impaction on the impaction surface 35 is not above a predetermined value, above which efficiency is reduced.

The second embodiment also illustrates the provision of a plurality of helical inclined surfaces 53 provided around the cylindrical support 38. These serve to direct the flow of gas entering the first chamber 42 into a helical path as it moves through the first chamber 42. This is illustrated schematically by the arrows in FIG. 7.

The dimensions for the two embodiments can be summarised in the following tables:

TABLE 1

| | | Approximate dimensions (mm or mm²) | |
|---|---|---|---|
| Aperture pair | Dimensions | Aperture 1 | Aperture 2 |
| 1 | x | 4.7 | 4.0 |
| | y | 2 | 1.5 |
| | S | 0.423 | 0.375 |
| | Area | 9.4 | 6 |
| | d | | 15.31 |
| | a | | 0.1 |
| | b | | 2 |
| | R | | 0.067 |

TABLE 1-continued

| | | Approximate dimensions (mm or mm²) | |
|---|---|---|---|
| Aperture pair | Dimensions | Aperture 1 | Aperture 2 |
| 2 | x | 4 | 4 |
| | y | 1.5 | 1.5 |
| | S | 0.375 | 0.375 |
| | Area | 6 | 6 |
| | d | | 11.61 |
| | a | | 0.1 |
| | b | | 2 |
| | R | | 0.067 |
| 3 | x | 4.5 | 4.5 |
| | y | 1.5 | 1.5 |
| | S | 0.33 | 0.33 |
| | Area | 6.75 | 6.75 |
| | d | | 8.41 |
| | a | | 0.1 |
| | b | | 2 |
| | R | | 0.067 |

Embodiment 1

Figure 14:
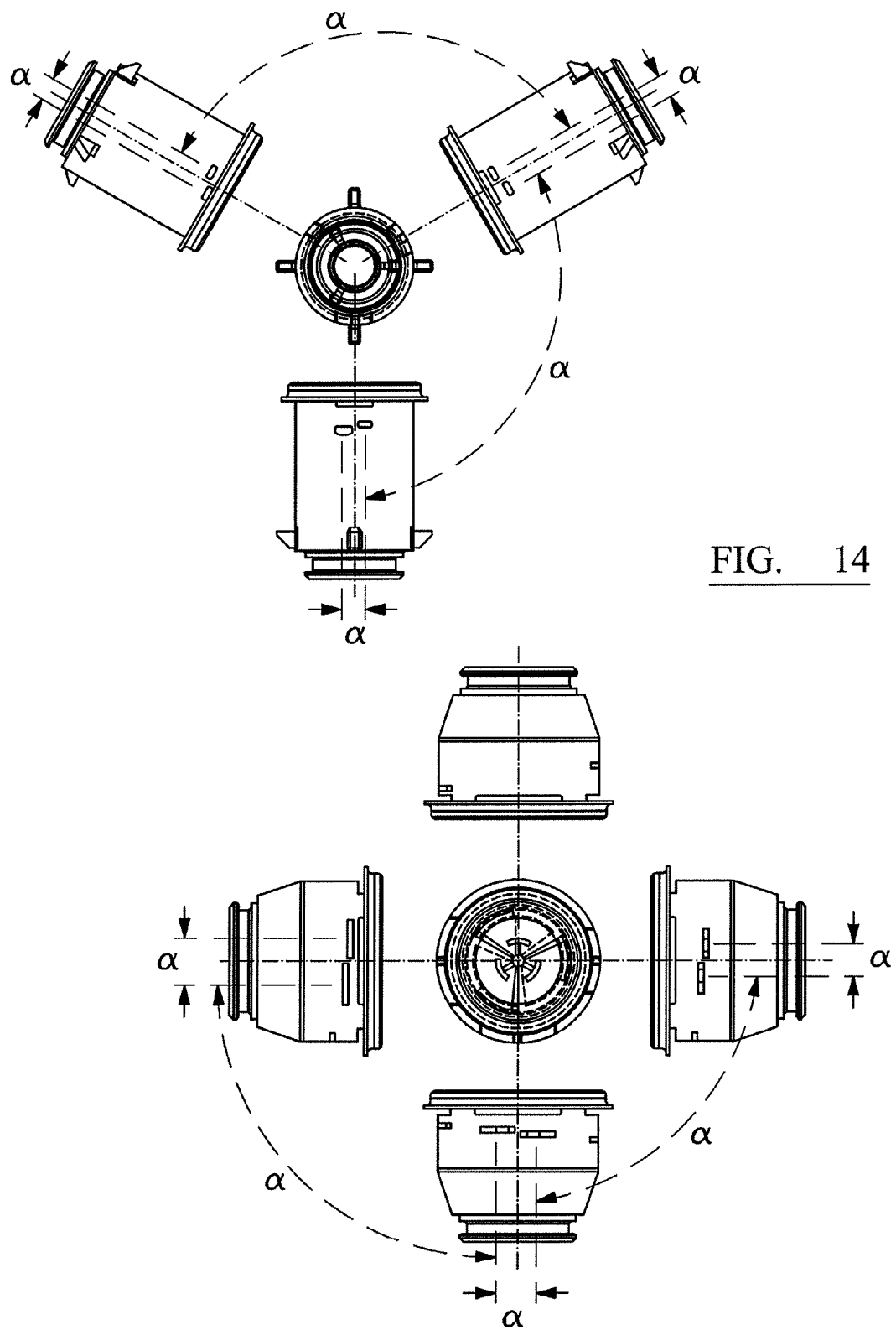
FIG. 14 corresponds to the views of FIGS. 6 and 9 illustrating the angular transverse offset between adjacent apertures in the direction of the actuator axis.

The inner diameter of dividing wall 28 is about 33.5 mm. The length of upper apertures 29' are approximately 12 mm. In this embodiment, the angular offset, a, between adjacent apertures around the actuator axis z can be calculated to be approximately between 20° and 23° when the adjacent apertures are part of an aperture pair, or approximately 98° when the adjacent apertures are in different aperture pairs. See FIG. 14.

TABLE 2

| | | Approximate dimensions (mm or mm²) | |
|---|---|---|---|
| Aperture pair | Parameter | Aperture | Aperture 2 |
| 1 | x | 10 | 10 |
| | y | 1.97 | 1.5 |
| | S | 0.197 | 0.15 |
| | Area | 19.7 | 15 |
| | d | | 19.97 |
| | a | | 0.1 |
| | b | | 2 |
| | R | | 0.051 |
| 2 | x | 12 | 12 |
| | y | 1.5 | 1.5 |
| | S | 0.125 | 0.125 |
| | Area | 18 | 18 |
| | d | | 16.3 |
| | a | | 0.1 |
| | b | | 2 |
| | R | | .067 |
| 3 | x | 14 | 14 |
| | y | 1.5 | 1.5 |
| | S | 0.11 | 0.11 |
| | Area | 21 | 21 |
| | d | | 13.1 |
| | a | | 0.1 |
| | b | | 2 |
| | R | | 0.067 |

Embodiment 2

The inner diameter of dividing wall 28 is around 53.5 mm. The length of upper apertures 29'' are approximately 30 mm. In this embodiment, the angular offset, a, between adjacent apertures around the actuator axis z can be calculated to be approximately between 25° and 35° when the adjacent apertures are part of an aperture pair, or approximately between 57° and 63° when the adjacent apertures are in different aperture pairs. See FIG. 14.

FIGS. 13A to 13G are schematic representations to illustrate examples of the orientations and spacing of the apertures around the dividing wall 28 which may be utilised in the invention. Different arrangements and spacings can be selected to achieve the required operational and functional capabilities required.

FIGS. 13A to 13G are schematic projections of the cylindrical dividing wall 28 into a two-dimensional space.

In all of the examples given below, the angular separation $\beta°$, $\beta°_1$, $\beta°_2$, $\beta°_3$ between groups $A_1$, $A_2$, $A_3$, $A_4$ of apertures is measured between the centre of the groups, or aperture when there is only one aperture.

Figure 13A:
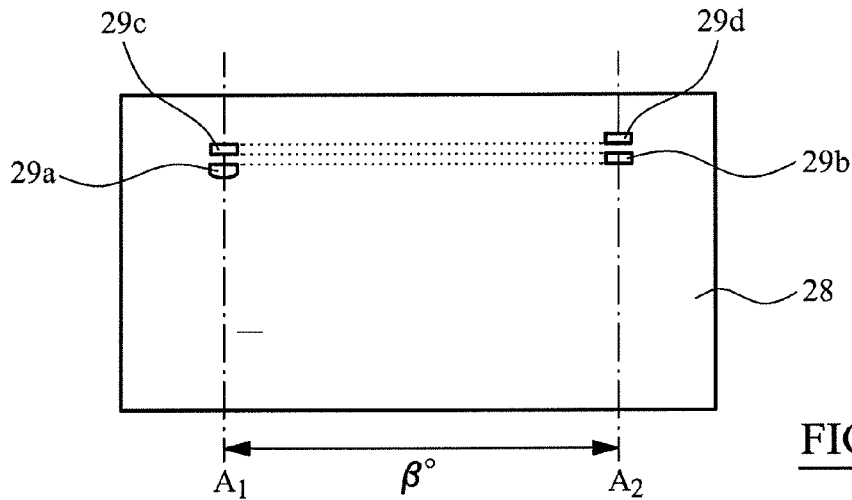
FIGS. 13A to 13G are schematic representations to illustrate examples of the orientations and spacing of the apertures in the dividing wall.

In FIG. 13A, the dividing wall 28 has four apertures $29_a$, $29_b$, $29_c$, $29_d$ that are arranged into two groups $A_1$, $A_2$ of axially aligned apertures.

The two groups $A_1$, $A_2$ are offset around the actuator axis z, the angular separation between the groups $A_1$, $A_2$, being denoted in FIG. 13A by $\beta°$.

Adjacent apertures in the axial direction are offset in a transverse direction around the actuator axis.

Thus, first aperture $29_a$ is adjacent second aperture $29_b$ and transversely offset with the angular separation $\beta°$. The second aperture $29_b$ is adjacent to third aperture $29_c$ and the two apertures are also transversely separation from each other with the angular separation of $\beta°$. Similarly, third aperture $29_c$ is adjacent fourth aperture $29_d$ with the same angular separation $\beta°$.

In this example, $\beta°$ is 180°.

Figure 13B:
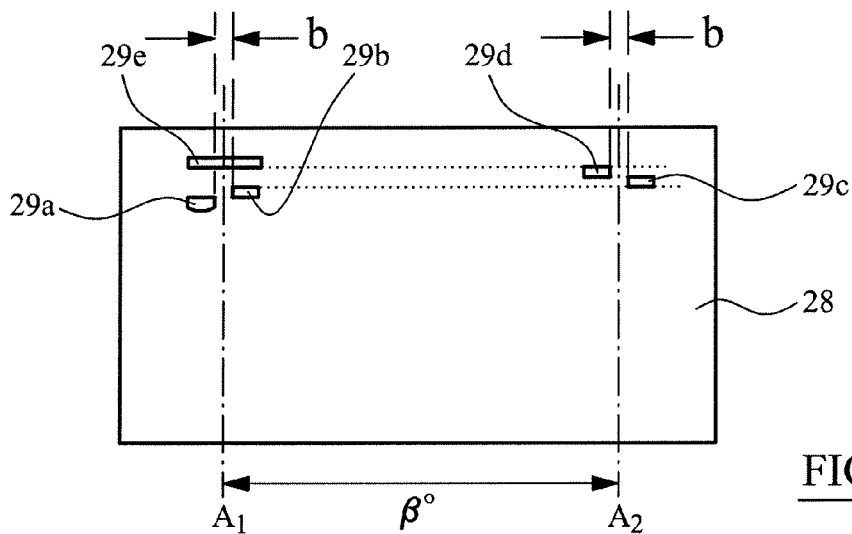

In FIG. 13B, the arrangement comprises five apertures arranged in two groups $A_1$, $A_2$.

The first aperture $29_a$ is adjacent to, and transversely offset from, the second aperture $29_b$, the third aperture $29_c$ is adjacent to, and transversely offset from, the second aperture $29_b$ and so on. In this arrangement, the first and second apertures $29_a$, $29_b$ and the third and fourth apertures $29_c$, $29_d$, have a transverse separation.

The fifth aperture $29_e$ is axially aligned with the first and second apertures $29_a$, $29_b$ to form the first group of apertures $A_1$. The fifth aperture $29_e$ is of a different width x than the other apertures $29_a$, $29_b$ $29_c$, $29_d$.

The third and fourth apertures $29_c$, $29_d$, form the second group of apertures $A_2$.

The two groups $A_1$, $A_2$ are offset around the actuator axis z, with the angular separation between centre the groups $A_1$, $A_2$ being denoted in FIG. 13B by $\beta°$. In this example, $\beta°$ is 180°.

Figure 13C:
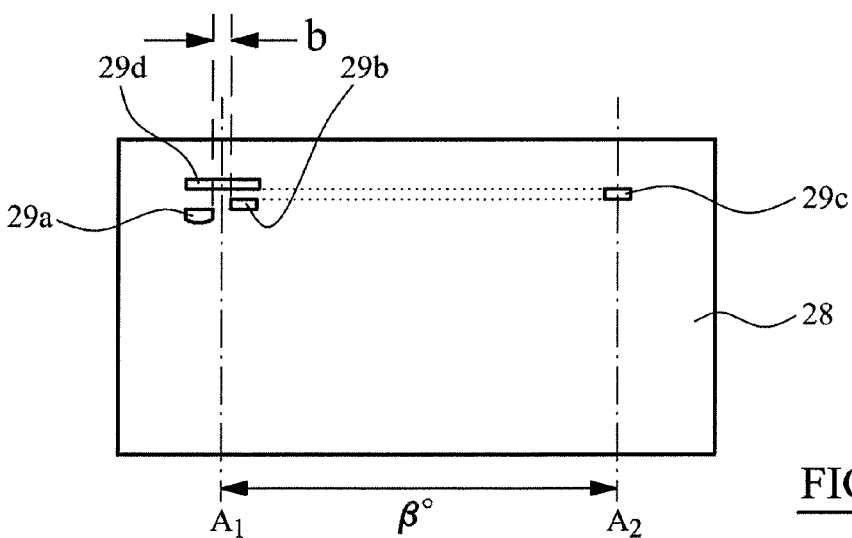

In FIG. 13C, there are four apertures, three arranged in an axially aligned group of apertures. In the first group $A_1$, the first aperture $29_a$ is adjacent to, and transversely offset from, the second aperture $29_b$.

The single, third aperture $29_c$ is transversely offset from the first group $A_1$, around the actuator axis z, with the angular separation between the centre of the axially-aligned group $A_1$ and the centre of the third aperture $29_c$ being denoted in FIG. 13C by $\beta°$.

The fourth aperture $29_d$ is axially aligned with the first and second apertures $29_a$, $29_b$ to form the first group $A_1$, and is transversely offset around the actuator axis z from the third aperture $29_c$ with the angular separation $\beta°$. In this example, $\beta°$ is 180°.

The fourth aperture $29_d$ is of a different width x than the other apertures $29_a$, $29_b$ $29_c$.

Figure 13D:
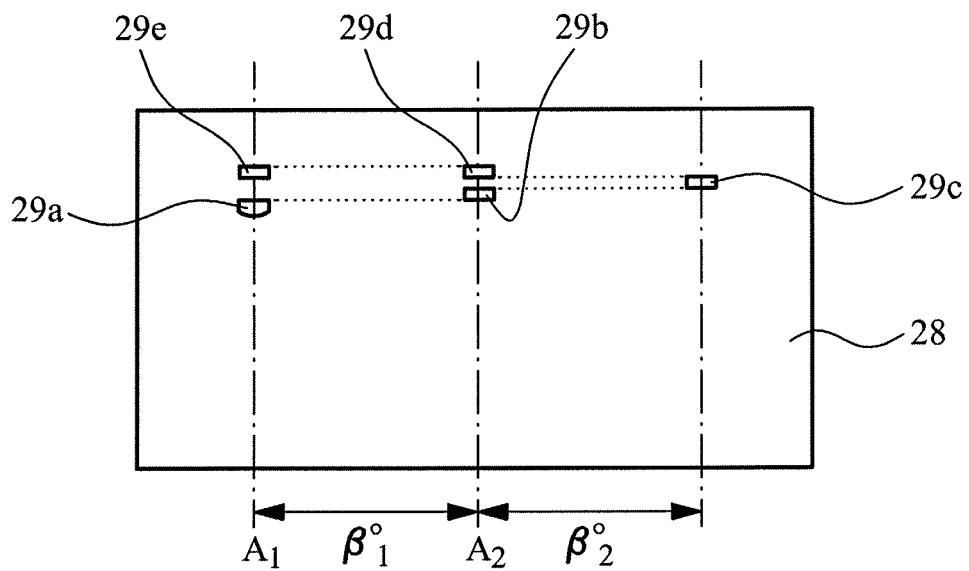

In FIG. 13D, five apertures are arranged into two groups $A_1$, $A_2$ of apertures and a single aperture $29_c$.

In this example, the first group $A_1$ is transversely offset from the second group $A_2$ around the actuator axis z, with an angular separation of $\beta°_1$—as measured from the centre of each group. The third aperture $29_c$ is transversely offset from the centre of the second group $A_2$ by an angular separation $\beta°_2$. In this example, $\beta°_1$ and $\beta°_2$ are 120°.

Figure 13E:
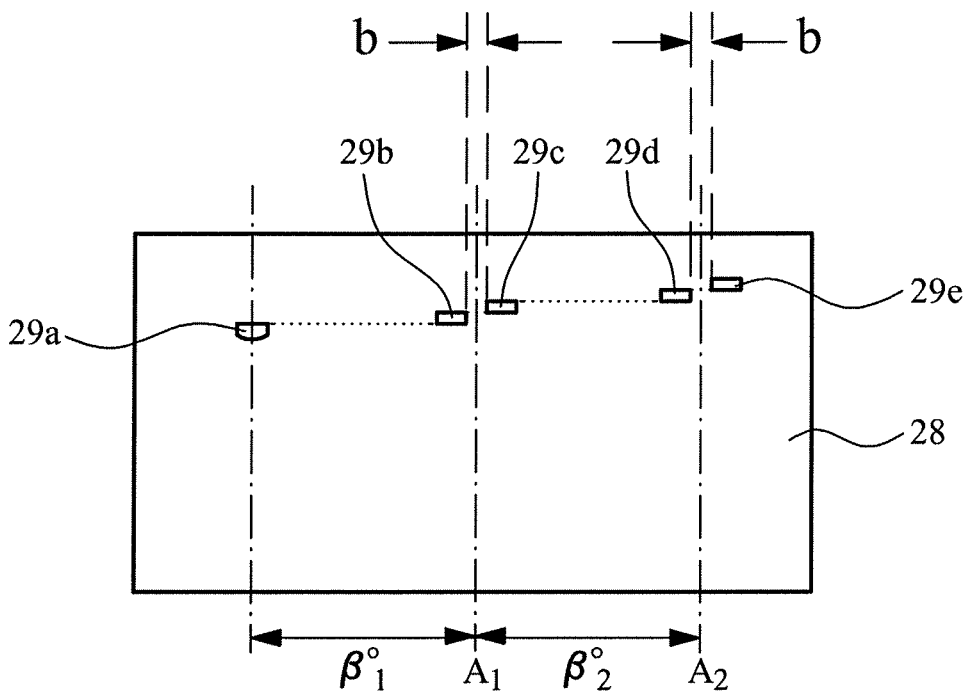

The arrangement illustrated in FIG. 13E also has two groups $A_1$, $A_2$ of apertures and a single, first aperture $29_a$.

In this example, the first aperture $29_a$ is transversely offset from the first group $A_1$ by an angular separation $\beta°_1$, and the second group $A_2$ is transversely offset from the first group $A_2$ with an angular separation of $\beta°_2$.

The second and third apertures $29_b$, $29_c$ and the fourth and fifth apertures $29_d$, $29_e$, have a transverse separation.

Figure 13F:
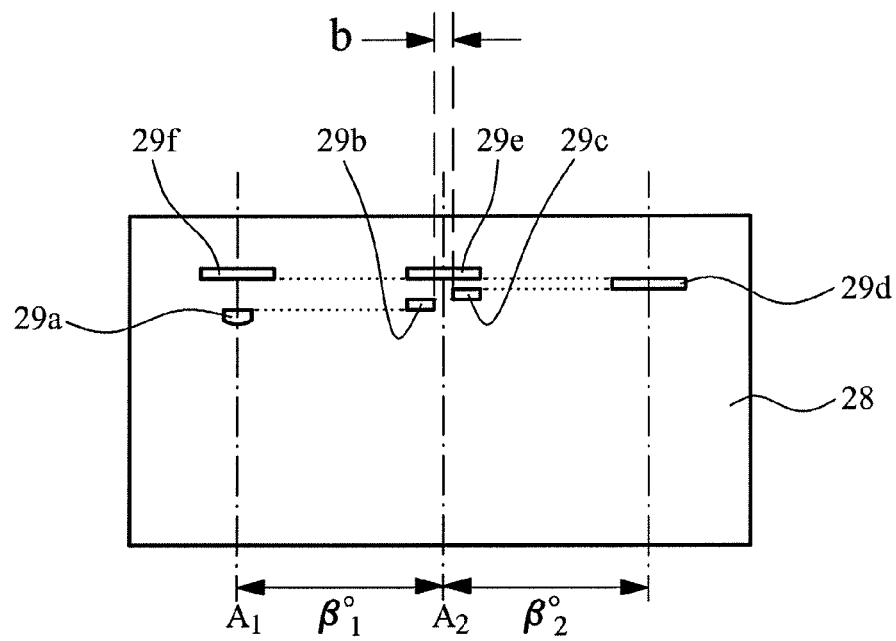

In the arrangement illustrated in FIG. 13F, there are six apertures arranged in a two-three-one grouping with different angular separations $\beta°_1$, $\beta°_2$ between the groups $A_1$, $A_2$ and the single aperture $29_d$. The first and second groups $A_1$, $A_2$, of two and three axially-aligned apertures respectively, are transversely offset with an angular separation $\beta°_1$. The first group $A_1$ includes the first and second apertures $29_a$ $29_f$.

The single, fourth aperture $29_d$ is transversely offset from the second group $A_2$ with an angular separation $\beta°_2$.

In the second group $A_2$, the second and third apertures $29_b$, $29_c$ have a transverse separation. The second group includes the fifth aperture $29_e$.

The fifth and sixth apertures $29_e$ $29_f$ are of a different width x than the other apertures.

Figure 13G:
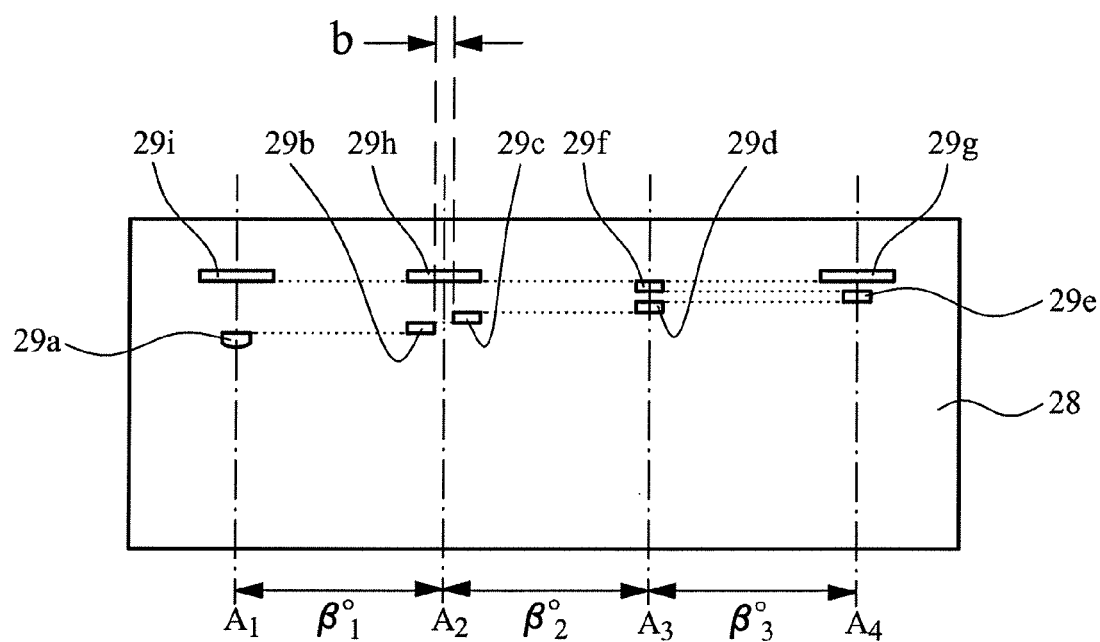

In the arrangement illustrated in FIG. 13G, there are nine apertures arranged in a two-three-two-two grouping $A_1$, $A_2$, $A_3$, $A_4$ of axially-aligned apertures, with angular separations $\beta°_1$, $\beta°_2$ $\beta°_3$ between the groups $A_1$, $A_2$, $A_3$, $A_4$. As can be seen in FIG. 13G, the sixth aperture $29_f$, which is adjacent the fifth aperture $29_e$ and the seventh aperture $29_g$ is in the third group $A_3$, with the adjacent apertures $29_e$ $29_g$ being in the fourth group $A_4$. As such, adjacent apertures in the axial direction can be in either a clockwise or anticlockwise transverse direction of each other.

In the second group $A_2$, the second and third apertures $29_b$, $29_c$ have a transverse separation. The seventh, eighth and ninth apertures $29_g$ $29_h$ $29_i$ are of a different width x than the other apertures.

In the examples described herein, the groups $A_1$, $A_2$, $A_3$, $A_4$ of axially aligned apertures are substantially equidistantly placed around the circumference of the dividing wall 28.

As such, the values of the angular separations $\beta°$ $\beta°_1$ $\beta°_2$ $\beta°_3$ for the arrangements described above are set out in the Table 3 below:

TABLE 3

| FIG. | $\beta°$ | $\beta°_1$ | $\beta°_2$ | $\beta°_3$ |
|---|---|---|---|---|
| FIG. 13A | 180° | | | |
| FIG. 13B | 180° | | | |
| FIG. 13C | 180° | | | |
| FIG. 13D | | 120° | 120° | |
| FIG. 13E | | 120° | 120° | |
| FIG. 13F | | 120° | 120° | |
| FIG. 13G | | 90° | 90° | 90° |

In other arrangements the values of the angular separations can be different.

The angular offset between adjacent apertures around the actuator axis z, and as measured between the centres of the apertures will vary depending upon the width of the apertures, the separation b between apertures, and the diameter of the separator. Examples of these values are shown with respect to Tables 1 and 2 and described above. The angular offset can be 180°, or can be less than 180°.

The illustrated arrangements are provided as examples only and alternative arrangements may be appropriate.

Although the separator is described with reference to a closed or open crankcase ventilator system, the separator can also be applied to a crankcase ventilator with a downstream pump system to increase separation efficiency, or to any system that requires oil aerosol separation.

The invention claimed is:

1. A separator for separating contaminants from a fluid stream which includes entrained particulate contaminants, comprising:
a first chamber having a cylindrical wall circumscribing a central axis, a first inlet through which a fluid stream enters the first chamber, to flow axially along the first chamber, the cylindrical wall having a plurality of apertures defined by edges, formed in the cylindrical wall through which the fluid stream can pass out of the first chamber,
an impaction surface located downstream of the first chamber, separated from an interior of the first chamber by the cylindrical wall, which is arranged to deflect the fluid stream after the fluid stream leaves the first chamber through the apertures, such that contaminants are separated from the fluid stream, and
an actuator which is arranged to move along an actuator axis which is parallel to the axis of the first chamber to adjust the open cross-sectional area of the apertures in the cylindrical wall according to a pressure differential between fluid pressure in the first chamber and a pressure reference by moving along the cylindrical wall so as progressively to occlude the apertures, the actuator comprising a diaphragm which separates the first chamber from a pressure reference, and comprises a tubular membrane which is fastened towards one end of the cylindrical wall and is arranged to fold and unfold progressively in response to a change in the differential pressure across the diaphragm so as respectively to uncover and cover the apertures, with the apertures having straight edges which extend perpendicular to the actuator axis in a circumferential direction around the cylindrical wall,
in which a first and second ones of the apertures (a) are spaced apart so that there is no axial overlap between them along the actuator axis, and (b) are the closest-spaced to one another along the actuator axis of any pair of the apertures which are spaced apart along the axis, and in which a ratio of the spacing between a closest of the edges of the first and second apertures along the actuator axis to an axial height of a smaller of the first and second apertures is not more than about 1.5, wherein the closest edges of the first and second apertures are straight along their lengths and extend perpendicular to the actuator axis.

2. A separator as claimed in claim 1, in which each of the first and second apertures is approximately rectangular.

3. A separator as claimed in claim 1, in which a ratio of a width of each of the first and second apertures measured transverse to the actuator axis to the axial height of the respective aperture is at least about 1.

4. A separator as claimed in claim 1, in which each aperture has a center, and the center of the second aperture is displaced along the cylindrical wall transversely relative to the center of the first aperture.

5. A separator as claimed in claim 4, in which the first and second apertures are spaced so that there is no transverse overlap between them along a direction perpendicular to the actuator axis.

6. A separator as claimed in claim 1, in which the first and second apertures are located close to one another on one side of the cylindrical wall.

7. A separator as claimed in claim 6, which includes at least a third aperture which is spaced apart from the first and second apertures around the a periphery of the cylindrical wall.

8. A separator as claimed in claim 7, which includes a fourth aperture which is located close to the third aperture, spaced apart around the periphery of the cylindrical wall from the first and second apertures.

9. A separator as claimed in claim 1, in which an internal diameter of a cylinder which is defined by the cylindrical wall is at least about 10 mm.

10. A separator as claimed in claim 1, in which an area of a smaller of the first and second apertures is at least about 0.2 $mm^2$.

11. A separator as claimed in claim 1, wherein the apertures are formed in the cylindrical wall in a direction that is perpendicular to a tangent to a surface of the cylindrical wall.

12. A separator as claimed in claim 11, wherein the angle between circumferentially spaced apart edge walls of the first aperture or the second aperture and the tangent to the surface of the cylindrical wall at each of the edge walls is not more than about 20°.

13. A separator as claimed in claim 1, in which the ratio of the spacing between a closest of the edges of the first and second apertures along the actuator axis to an axial height of a smaller of the first and second apertures is at least about 0.05 and not more than about 0.075.

* * * * *